(12) United States Patent
Cross et al.

(10) Patent No.: US 11,987,914 B2
(45) Date of Patent: May 21, 2024

(54) ACTIVATED POROUS FIBERS AND PRODUCTS INCLUDING SAME

(71) Applicant: Unifrax I LLC, Tonawanda, NY (US)

(72) Inventors: Jonathan Cross, Warrington (GB); Adam Kelsall, Northwich (GB); Bruce Zoitos, Williamsville, NY (US); Chad Cannan, Lancaster, NY (US)

(73) Assignee: Unifrax I LLC, Tonawanda, NY (US)

( * ) Notice: Subject to any disclaimer, the term of this patent is extended or adjusted under 35 U.S.C. 154(b) by 0 days.

(21) Appl. No.: 16/375,114

(22) Filed: Apr. 4, 2019

(65) Prior Publication Data

US 2019/0309455 A1 Oct. 10, 2019

Related U.S. Application Data

(60) Provisional application No. 62/652,551, filed on Apr. 4, 2018.

(51) Int. Cl.
*D04H 1/4209* (2012.01)
*B01D 53/86* (2006.01)
(Continued)

(52) U.S. Cl.
CPC .......... *D04H 1/4209* (2013.01); *B01D 53/86* (2013.01); *B01J 23/40* (2013.01); *B01J 35/56* (2024.01);
(Continued)

(58) Field of Classification Search
CPC ........ D04H 1/4209; D04H 1/52; D04H 1/728; D04H 1/732; B01D 53/86; B01D 3/86; B01D 2255/102; B01D 2255/90; B01D 2257/502; B01D 2257/504; B01D 2257/602; B01D 2257/702; B01D 2257/708; F01N 3/035; F01N 3/101; F01N 3/2835; F01N 3/10; B01J 23/40;
(Continued)

(56) References Cited

U.S. PATENT DOCUMENTS 2,215,039 A  9/1940 Hood et al.
2,221,709 A  11/1940 Hood et al.
(Continued)

FOREIGN PATENT DOCUMENTS

CA  2976143 A1  9/2016
CN  1247485 A  3/2000
(Continued)

OTHER PUBLICATIONS

International Search Report and Written Opinion received in International Application No. PCT/US19/25562, dated Jun. 17, 2019, 14 pages.

(Continued)

*Primary Examiner* — Matthew D Matzek
(74) *Attorney, Agent, or Firm* — Hayne and Boone, LLP

(57) ABSTRACT

A composition including inorganic fibers having a surface area of at least 5 m²/g and an active agent incorporated into the inorganic fibers and/or applied onto at least a portion of the inorganic fibers. Products including the composition may include fiber aggregates, composite materials, filter elements, catalytic elements, exhaust gas treatment devices and other exhaust system components, and papers.

29 Claims, 10 Drawing Sheets

(51) Int. Cl.
   *B01J 23/40* (2006.01)
   *B01J 35/56* (2024.01)
   *B01J 37/02* (2006.01)
   *D04H 1/52* (2006.01)
   *F01N 3/035* (2006.01)
   *F01N 3/10* (2006.01)
   *F01N 3/28* (2006.01)

(52) U.S. Cl.
   CPC ............ *B01J 37/0201* (2013.01); *D04H 1/52* (2013.01); *F01N 3/035* (2013.01); *F01N 3/101* (2013.01); *F01N 3/2835* (2013.01); *B01D 2255/102* (2013.01)

(58) Field of Classification Search
   CPC ........ B01J 35/04; B01J 37/0201; B01J 23/42; B01J 35/023; B01J 35/06; Y02C 20/40
   USPC ...... 977/762, 773; 428/304.4, 307.3, 311.11, 428/364, 401, 375; 502/313, 326, 60, 502/106, 232, 240, 300; 422/176, 177; 442/172, 343, 368, 406, 410, 332, 340
   See application file for complete search history.

(56) References Cited

U.S. PATENT DOCUMENTS

| | | |
|---|---|---|
| 2,461,841 A | 2/1949 | Nordberg |
| 2,491,761 A | 12/1949 | Parker et al. |
| 2,500,092 A | 3/1950 | Parker et al. |
| 2,624,658 A | 1/1953 | Parker et al. |
| 2,635,390 A | 4/1953 | Parker |
| 2,686,954 A | 8/1954 | Parker |
| 2,718,461 A | 9/1955 | Parker et al. |
| 2,730,475 A | 1/1956 | Parker |
| 3,950,478 A | 4/1976 | Kenworthy et al. |
| 4,127,556 A | 11/1978 | Ushitani et al. |
| 4,177,168 A * | 12/1979 | Denny ..................... B01J 23/40 |
| | | 502/313 |
| 4,397,772 A | 8/1983 | Noakes et al. |
| 4,520,124 A | 5/1985 | Abe et al. |
| 4,761,323 A | 8/1988 | Mühlratzer et al. |
| 4,792,478 A * | 12/1988 | Taylor ....................... D01F 9/08 |
| | | 428/221 |
| 4,942,020 A | 7/1990 | Whittenberger et al. |
| 5,100,632 A * | 3/1992 | Dettling ................. B01D 53/86 |
| | | 423/213.5 |
| 5,108,977 A | 4/1992 | Yoshida et al. |
| 5,154,901 A | 10/1992 | Yoshida et al. |
| 5,164,351 A | 11/1992 | Steinbach et al. |
| 5,168,820 A | 12/1992 | Birkner et al. |
| 5,176,857 A | 1/1993 | Stacey et al. |
| 5,294,584 A | 3/1994 | Yoshida et al. |
| 5,332,699 A | 7/1994 | Olds et al. |
| 5,425,236 A | 6/1995 | Haerle |
| 5,492,667 A | 2/1996 | Numoto et al. |
| 5,552,123 A | 9/1996 | Numoto et al. |
| 5,585,312 A | 12/1996 | TenEyck et al. |
| 5,714,421 A | 2/1998 | Olds et al. |
| 5,811,360 A | 9/1998 | Jubb |
| 5,821,183 A | 10/1998 | Jubb |
| 5,874,375 A | 2/1999 | Zoitos et al. |
| 5,879,645 A | 3/1999 | Park et al. |
| 5,928,975 A | 7/1999 | Jubb |
| 5,955,389 A | 9/1999 | Jubb |
| 6,025,288 A | 2/2000 | Zoitos et al. |
| 6,030,910 A | 2/2000 | Zoitos et al. |
| 6,162,759 A | 12/2000 | Oki et al. |
| 6,191,067 B1 * | 2/2001 | Koike ..................... B01J 21/063 |
| | | 423/594.8 |
| 6,284,201 B1 | 9/2001 | Buck |
| 6,365,092 B1 | 4/2002 | Backa et al. |
| 6,524,680 B1 | 2/2003 | Tanaka et al. |
| 6,667,017 B2 | 12/2003 | Murrell et al. |
| 6,811,868 B2 | 11/2004 | Hasegawa et al. |
| 6,861,381 B1 | 3/2005 | Jubb et al. |
| 6,953,757 B2 | 10/2005 | Zoitos et al. |
| 7,067,452 B2 | 6/2006 | Tanaka et al. |
| 7,153,796 B2 | 12/2006 | Jubb et al. |
| 7,211,232 B1 | 5/2007 | Zuberi |
| 7,259,118 B2 | 8/2007 | Jubb et al. |
| 7,259,121 B2 | 8/2007 | Schwefer et al. |
| 7,358,210 B2 | 4/2008 | Tanaka et al. |
| 7,444,805 B2 | 11/2008 | Zuberi et al. |
| 7,449,427 B2 | 11/2008 | Ohno et al. |
| 7,521,025 B2 | 4/2009 | Ohno et al. |
| 7,553,531 B2 | 6/2009 | Ohno et al. |
| 7,559,967 B2 | 7/2009 | Oya et al. |
| 7,563,415 B2 | 7/2009 | Zuberi |
| 7,566,425 B2 | 7/2009 | Zuberi |
| 7,566,426 B2 | 7/2009 | Zuberi |
| 7,567,817 B2 | 7/2009 | Liu et al. |
| 7,576,035 B2 | 8/2009 | Ohno et al. |
| 7,605,110 B2 | 10/2009 | Yamada et al. |
| 7,638,459 B2 | 12/2009 | Rende et al. |
| 7,682,577 B2 | 3/2010 | Zuberi et al. |
| 7,682,578 B2 | 3/2010 | Zuberi et al. |
| 7,722,828 B2 | 5/2010 | Zuberi et al. |
| 7,772,147 B2 | 8/2010 | Collier et al. |
| 7,838,462 B2 | 11/2010 | Kita et al. |
| 7,851,041 B2 | 12/2010 | Ohno et al. |
| 7,871,958 B2 | 1/2011 | Ido |
| 7,879,427 B2 | 2/2011 | Ohno et al. |
| 7,879,428 B2 | 2/2011 | Ohno et al. |
| 7,879,429 B2 | 2/2011 | Ohno et al. |
| 7,879,430 B2 | 2/2011 | Ohno et al. |
| 7,879,432 B2 | 2/2011 | Ohno et al. |
| 7,897,255 B2 | 3/2011 | Liu et al. |
| 7,906,091 B2 | 3/2011 | Schwefer et al. |
| 7,981,274 B2 | 7/2011 | Nacken et al. |
| 8,038,956 B2 | 10/2011 | Li |
| 8,110,274 B2 | 2/2012 | Ohno et al. |
| 8,114,354 B2 | 2/2012 | Li |
| 8,147,764 B2 | 4/2012 | Fujita |
| 8,173,074 B2 | 5/2012 | Döring |
| 8,197,767 B2 | 6/2012 | Ido et al. |
| 8,283,019 B2 | 10/2012 | Ohno et al. |
| 8,445,403 B2 | 5/2013 | Frantz et al. |
| 8,535,632 B2 | 9/2013 | Chase et al. |
| 8,859,454 B2 | 10/2014 | Bentele et al. |
| 9,028,946 B2 | 5/2015 | Cai et al. |
| 9,539,562 B2 | 1/2017 | Bentele et al. |
| 9,738,521 B2 | 8/2017 | Schwefer et al. |
| 9,757,718 B2 | 9/2017 | Fedeyko et al. |
| 10,071,340 B2 | 9/2018 | Castellino et al. |
| 10,252,256 B2 | 4/2019 | Jørgensen |
| 10,569,264 B2 | 2/2020 | Bauer et al. |
| 10,899,617 B2 | 1/2021 | Schwefer et al. |
| 10,987,658 B2 | 4/2021 | Camm et al. |
| 2001/0011449 A1 | 8/2001 | Pellegrino |
| 2002/0039964 A1 | 4/2002 | Tanaka et al. |
| 2002/0077248 A1 | 6/2002 | Nakanishi et al. |
| 2003/0106311 A1 | 6/2003 | Moore, III et al. |
| 2005/0042151 A1 * | 2/2005 | Alward ................. D04H 1/4209 |
| | | 422/177 |
| 2005/0227058 A1 * | 10/2005 | Ohashi ..................... B01J 21/12 |
| | | 428/292.1 |
| 2005/0279062 A1 | 12/2005 | Reinsch et al. |
| 2006/0048501 A1 * | 3/2006 | Rasmussen ............ B01D 53/86 |
| | | 60/286 |
| 2006/0177629 A1 * | 8/2006 | Kunieda ................. C04B 35/18 |
| | | 428/116 |
| 2008/0171650 A1 * | 7/2008 | Alward .................... F01N 3/027 |
| | | 502/340 |
| 2008/0241003 A1 | 10/2008 | Ido et al. |
| 2009/0246451 A1 | 10/2009 | Ido et al. |
| 2011/0052467 A1 * | 3/2011 | Chase ................ B01D 53/8678 |
| | | 423/239.1 |
| 2012/0049114 A1 | 3/2012 | Seeker et al. |
| 2012/0258855 A1 | 10/2012 | Dekker et al. |
| 2015/0251163 A1 | 9/2015 | Ohshima et al. |

(56) References Cited

U.S. PATENT DOCUMENTS

| | | | |
|---|---|---|---|
| 2015/0321185 A1 | 11/2015 | Ueno et al. | |
| 2016/0244001 A1* | 8/2016 | Chauhan | D04H 1/4209 |

FOREIGN PATENT DOCUMENTS

| | | |
|---|---|---|
| CN | 1420804 A | 5/2003 |
| CN | 1787869 A | 6/2006 |
| CN | 101637301 A | 2/2010 |
| CN | 101977842 A | 2/2011 |
| CN | 102137718 A | 7/2011 |
| CN | 102740947 A | 10/2012 |
| CN | 103892461 A | 7/2014 |
| CN | 205517799 U | 8/2016 |
| CN | 106540754 A | 3/2017 |
| CN | 106893432 A | 6/2017 |
| CN | 112717991 A | 4/2021 |
| DE | 2835741 A1 | 2/1980 |
| DE | 3347585 A1 | 9/1984 |
| EP | 0211233 A1 | 2/1987 |
| EP | 0318203 A2 | 5/1989 |
| EP | 0375391 A1 | 6/1990 |
| EP | 0605853 A1 | 7/1994 |
| EP | 1714697 A1 | 10/2006 |
| EP | 1736220 A1 | 12/2006 |
| EP | 1222016 B1 | 1/2007 |
| EP | 1803494 A2 | 7/2007 |
| EP | 1520614 B1 | 8/2007 |
| EP | 1399259 B1 | 9/2007 |
| EP | 1847319 A1 | 10/2007 |
| EP | 1927391 A1 | 6/2008 |
| EP | 1739066 B1 | 8/2008 |
| EP | 1974796 A1 | 10/2008 |
| EP | 1974797 A1 | 10/2008 |
| EP | 1977818 A1 | 10/2008 |
| EP | 1738815 B1 | 3/2009 |
| EP | 1736459 B1 | 4/2009 |
| EP | 1785603 B1 | 6/2009 |
| EP | 2105182 A1 | 9/2009 |
| EP | 2105195 A1 | 9/2009 |
| EP | 2130590 A2 | 12/2009 |
| EP | 2130596 A2 | 12/2009 |
| EP | 2130598 A2 | 12/2009 |
| EP | 2130599 A2 | 12/2009 |
| EP | 2130601 A2 | 12/2009 |
| EP | 2130602 A2 | 12/2009 |
| EP | 2130603 A2 | 12/2009 |
| EP | 2130604 A2 | 12/2009 |
| EP | 2130605 A2 | 12/2009 |
| EP | 2130606 A2 | 12/2009 |
| EP | 2130806 A2 | 12/2009 |
| EP | 1961480 B1 | 3/2010 |
| EP | 1992394 B1 | 5/2010 |
| EP | 1754526 B1 | 11/2010 |
| EP | 2105589 B1 | 11/2010 |
| EP | 2105194 B1 | 1/2011 |
| EP | 1779930 B1 | 2/2011 |
| EP | 1982762 B1 | 2/2011 |
| EP | 2105427 B1 | 3/2011 |
| EP | 1997943 B1 | 4/2011 |
| EP | 2105271 B1 | 4/2011 |
| EP | 1927392 B1 | 6/2011 |
| EP | 2105192 B1 | 10/2011 |
| EP | 1762710 B1 | 3/2012 |
| EP | 1985352 B1 | 8/2012 |
| EP | 2105425 B1 | 9/2012 |
| EP | 2130589 B1 | 3/2013 |
| EP | 2130591 B1 | 3/2013 |
| EP | 2130592 B1 | 3/2013 |
| EP | 1857180 B1 | 5/2013 |
| EP | 1475151 B1 | 6/2013 |
| EP | 1726698 B1 | 7/2013 |
| EP | 2130588 B1 | 8/2014 |
| EP | 2130593 B1 | 9/2014 |
| EP | 2130597 B1 | 9/2014 |
| EP | 2130600 B1 | 9/2014 |
| EP | 2158956 B1 | 10/2014 |
| EP | 2130594 B1 | 2/2015 |
| EP | 2130595 B1 | 2/2015 |
| EP | 1717218 B1 | 4/2015 |
| EP | 2539050 B1 | 9/2015 |
| EP | 3072585 A1 | 9/2016 |
| EP | 3 103 550 A1 | 12/2016 |
| EP | 3 271 049 B1 | 3/2020 |
| EP | 3 010 642 B1 | 3/2021 |
| GB | 1012473 A | 12/1965 |
| GB | 1382984 A | 2/1975 |
| GB | 1 425 631 A | 2/1976 |
| GB | 1501381 A | 2/1978 |
| GB | 1 505 826 A | 3/1978 |
| GB | 1519343 A | 7/1978 |
| GB | 2037342 A | 7/1980 |
| GB | 2079172 A | 1/1982 |
| GB | 2514266 B | 5/2017 |
| GB | 2544203 B | 9/2020 |
| JP | H0647283 A | 2/1994 |
| JP | Hei10-195763 | 7/1998 |
| JP | 2002-180822 A | 6/2002 |
| JP | 2002-206418 A | 7/2002 |
| JP | 2007-117805 A | 5/2007 |
| JP | 2007-244950 A | 9/2007 |
| JP | 2010-510884 A | 4/2010 |
| JP | 2015-202469 | 11/2015 |
| KR | 10-2007-0100783 | 10/2007 |
| MX | 2011005610 A | 6/2011 |
| WO | WO 89/11904 A1 | 12/1989 |
| WO | WO 92/14547 A1 | 9/1992 |
| WO | WO 98/30326 A1 | 7/1998 |
| WO | WO-9830326 A1 * | 7/1998 ............ B01D 39/00 |
| WO | WO 01/34294 A1 | 5/2001 |
| WO | WO 2005/049203 A2 | 6/2005 |
| WO | WO 2005/113126 A1 | 12/2005 |
| WO | WO 2007/056710 A2 | 5/2007 |
| WO | WO 2008/067375 A1 | 6/2008 |
| WO | WO 2008/086445 A1 | 7/2008 |
| WO | WO 2009/052274 A1 | 4/2009 |
| WO | WO 2009/079250 A1 | 6/2009 |
| WO | WO 2009/137110 A1 | 11/2009 |
| WO | WO 2011/092525 A1 | 8/2011 |
| WO | WO 2011/127095 A2 | 10/2011 |
| WO | WO 2016/080551 A1 | 5/2016 |
| WO | WO 2016/150464 A1 | 9/2016 |
| WO | WO 2016/150465 A1 | 9/2016 |
| WO | WO 2016/150523 A1 | 9/2016 |
| WO | WO 2017/134454 A1 | 8/2017 |
| WO | WO 2017/153237 A1 | 9/2017 |
| WO | WO 2017/153239 A1 | 9/2017 |
| WO | WO 2018/099956 A1 | 6/2018 |
| WO | WO 2018/100537 A1 | 6/2018 |
| WO | WO 2018/154463 A1 | 8/2018 |
| WO | WO 2018/197851 A1 | 11/2018 |
| WO | WO 2018/226543 A1 | 12/2018 |
| WO | WO 2019/229040 A1 | 12/2019 |
| WO | WO 2019/238699 A1 | 12/2019 |

OTHER PUBLICATIONS

Extended Examination Search Report for European Patent Application No. 19780719.1 issued by the European Patent Office, dated Dec. 15, 2021. (8 pgs.).

First Office Action for Japanese Patent Application No. 2020-554156 issued by the Japan Patent Office, dated Jan. 4, 2022. (4 pgs.).

First Office Action for Chinese Patent Application No. 201980037421.2 issued by the China National Intellectual Property Administration, dated Jan. 4, 2022. (14 pgs.).

English Translation of First Office Action for Chinese Patent Application No. 201980037421.2 issued by the China National Intellectual Property Administration, dated Jan. 4, 2022. (7 pgs.).

Notice of Grounds for Rejection for Korean Patent Application No. 10-2020-7030694 issued by The Korean Intellectual Property Office, dated Feb. 7, 2022. (7 pgs.).

(56) References Cited

OTHER PUBLICATIONS

English Translation of Notice of Grounds for Rejection for Korean Patent Application No. 10-2020-7030694 issued by The Korean Intellectual Property Office, dated Feb. 7, 2022. (6 pgs.).
Decision of Rejection for Chinese Patent Application No. 201980037421.2 issued by the China National Intellectual Property Administration, dated Dec. 29, 2022, (20 pgs.).
English Translation of Decision of Rejection for Chinese Patent Application No. 201980037421.2 issued by the China National Intellectual Property Administration, dated Dec. 29, 2022, (9 pgs.).
68. Roles of Zeolite and Maifanite in Aaquaculture, by Gu Deping et al., pp. 50-51, Sep. 2010, Golden Shield Press, Questions and Answers on Aquatic Animal Medication Technology. (4 pgs.).
31. Application of Maifanite and Enriched Maifanite in Animal Husbandry, by Tao Min et al., pp. 156, Aug. 1994, China Environmental Science Press, Hunan Province Natural Resources Research vol. 1. (3 pgs.).
Final Office Action for Japanese Patent Application No. 2020-554156 issued by the Japan Patent Office, dated Jul. 26, 2022, (3 pgs.).
English Translation of Final Office Action for Japanese Patent Application No. 2020-554156 issued by the Japan Patent Office, dated Jul. 26, 2022, (2 pgs.).
Second Office Action for Chinese Patent Application No. 201980037421.2 issued by the China National Intellectual Property Administration, dated Jul. 13, 2022, (22 pgs.).
English Translation of Second Office Action for Chinese Patent Application No. 201980037421.2 issued by the China National Intellectual Property Administration, dated Jul. 13, 2022, (9 pgs.).
"5.2 The harm of pollutant emissions from internal combustion engines", by Huang Yiquan, pp. 53-54, Mar. 1998, Dalian Maritime University Press, Air Pollution and Purification.
Chapter 10 Inorganic Fibers, by Xi Peng et al., pp. 424-425, Sep. 2004, Chemical Industry Press, High-tech Fibers.
Notice of Allowance for Canadian Patent Application No. 3,094,306 issued by the Canadian Patent Office, dated Dec. 6, 2023, (1 pg.).

\* cited by examiner

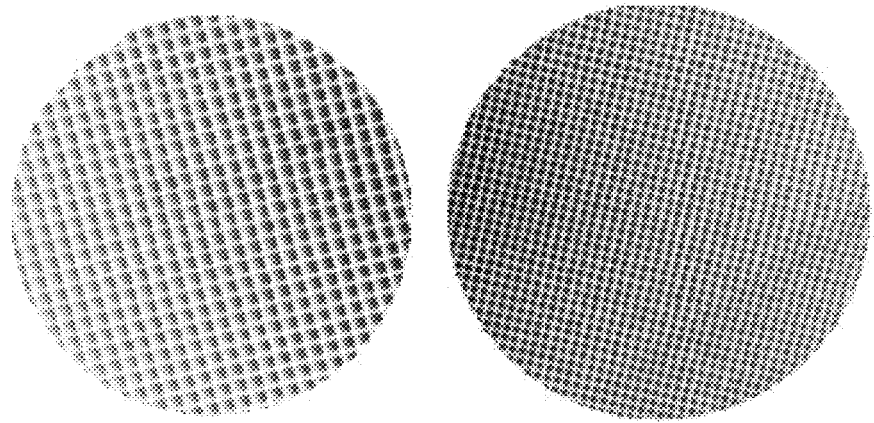
FIG. 12A 400cpsi
FIG. 12B 900cpsi
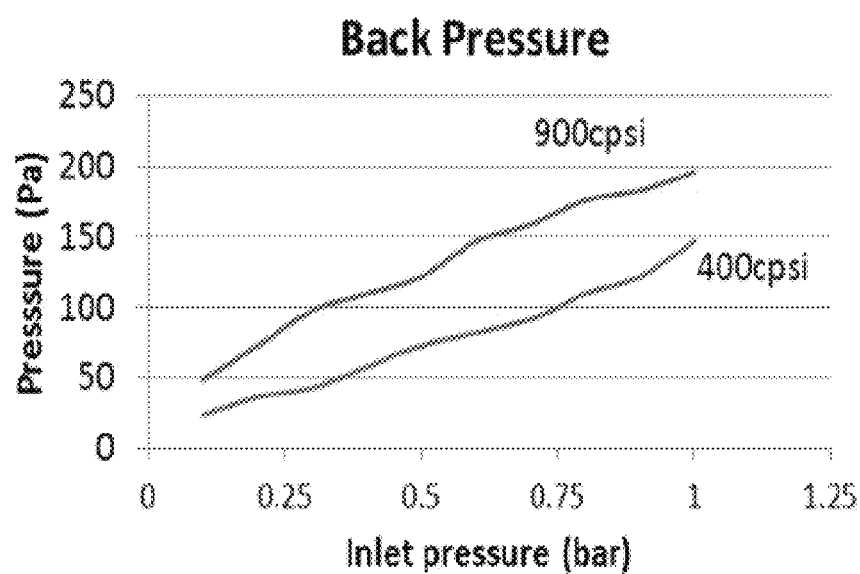
FIG. 13

ACTIVATED POROUS FIBERS AND PRODUCTS INCLUDING SAME

RELATED APPLICATION

This application claims priority to U.S. Provisional Patent Application No. 62/652,551 filed Apr. 4, 2018, the contents of which are hereby incorporated by reference in their entirety.

TECHNICAL FIELD

The present disclosure relates to activated fiber compositions including porous inorganic fibers and an active agent incorporated into and/or applied onto at least a portion of the inorganic fibers, and product forms including the activated fiber compositions.

BACKGROUND

Many manufacturing, industrial and other processes generate waste gases which must be processed to some degree prior to discharge into the environment. For example, electrical power generation is sometimes performed by combusting carbon-based fuels to generate heat, which can be converted into electricity via steam turbines. Similarly, concrete and glass production plants combust fuels to generate heat as part of the production processes. Further, internal combustion engines, which may be used in numerous systems, generate electrical and/or motive power by combusting fuels, such as gasoline or diesel fuel. All of these processes are capable of generating waste gases which must be processed to a degree prior to discharge to the environment.

These waste gases may include carbon monoxide, carbon dioxide, nitrogen oxides, sulfur oxides, hydrogen chloride, hydrogen fluoride, arsenic, boron, lead, mercury, and other harmful gases (e.g., unburned hydrocarbons ("HC") and volatile organic compounds ("VOC")) and/or particles. Some or all of these undesirable components of waste gases may be removed by various conventional techniques, many of which involve filters and/or catalyst supports which may physically remove and/or chemically alter the undesirable components prior to discharge to the environment.

Many of the conventional components for conducting these abatement processes suffer from deficiencies. For example, in certain circumstances, ceramic honeycomb filters/catalyst supports are used to remove and/or chemically modify undesirable components found in exhaust gases. These supports may be undesirably heavy, may have low heat tolerance, and/or may be expensive to install and/or operate.

An example of an industrial process which generates waste gases which must be processed prior to discharge into the environment is fluid catalytic cracking ("FCC"). FCC processes are used to convert high molecular weight hydrocarbon to more valuable shorter-chain hydrocarbon groups, such as gasoline or olefins. FCC processes consume large amounts of energy in producing steam, heating the feedstock, and regenerating the catalysts. FCC processes would benefit from lower cost catalytic support materials which may reduce the amount of energy required to catalyze the feedstocks and regenerate the catalyst support materials, as well as materials which would increase the efficiency of processing the waste gases generated by FCC processes.

Other industrial processes may also benefit from improved catalytic support materials, such as: synthesis of ethylene oxide using silver catalysts on alumina; desulfurization of petroleum using molybdenum-cobalt catalysts on alumina; benzene hydrogenation to cyclohexane using nickel/platinum catalysts; production of synthesis gas ("syn gas") using nickel catalysts; reforming of naphtha using platinum and rhenium catalysts on alumina; making epoxyethane using silver catalysts on alumina; or making sulfuric acid using vanadium catalysts.

What is needed is a composition which may be used in many different product forms to produce light-weight, high temperature resistance, lower cost and/or energy efficient components for waste gas treatment systems and other manufacturing/industrial processes. Such compositions and/or product forms may be capable of replacing existing ceramic substrates such as spheres, powders, etc. with such compositions/product forms.

BRIEF DESCRIPTION OF DRAWINGS

Embodiments of the subject matter are disclosed with reference to the accompanying drawings which are intended for illustrative purposes only. The subject matter is not limited in its application to the details of construction or the arrangement of the components illustrated in the drawings. Like reference numerals are used to indicate like components, unless otherwise indicated.

FIG. 12A is a photograph of a conventional ceramic honeycomb filter.

FIG. 12B is a photograph of a conventional ceramic honeycomb filter.

FIG. 13 is a graph showing the back pressure generation of the ceramic honeycomb filters shown in FIGS. 12A and 12B.

SUMMARY

Figure 1A:
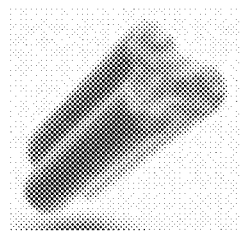
FIG. 1A is an illustrative embodiment of a product form including an activated fiber composition as described herein.
Figure 1B:
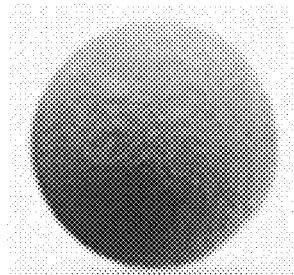
FIG. 1B is an illustrative embodiment of a product form including an activated fiber composition as described herein.
Figure 1C:
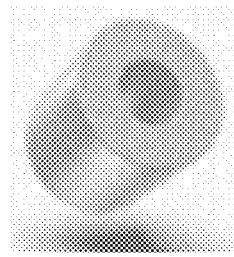
FIG. 1C is an illustrative embodiment of a product form including an activated fiber composition as described herein.
Figure 1D:
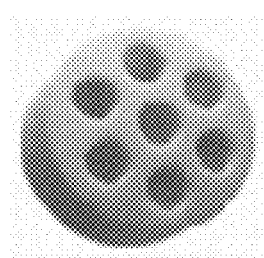
FIG. 1D is an illustrative embodiment of a product form including an activated fiber composition as described herein.
Figure 1E:
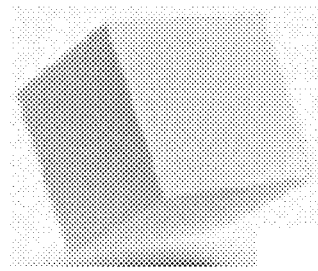
FIG. 1E is an illustrative embodiment of a product form including an activated fiber composition as described herein.
Figure 1F:
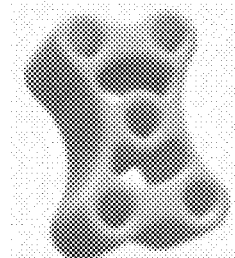
FIG. 1F is an illustrative embodiment of a product form including an activated fiber composition as described herein.
Figure 1G:
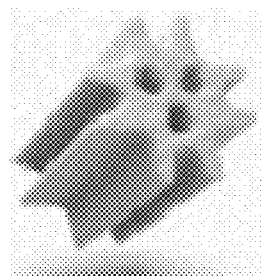
FIG. 1G is an illustrative embodiment of a product form including an activated fiber composition as described herein.
Figure 1H:
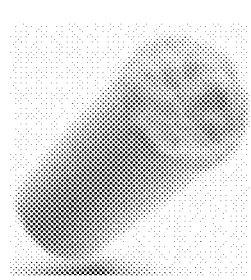
FIG. 1H is an illustrative embodiment of a product form including an activated fiber composition as described herein.

Provided are activated fiber compositions including porous inorganic fibers and an active agent incorporated into and/or applied onto at least a portion of the inorganic fibers. In certain embodiments, the activated fiber compositions may include: (a) inorganic fibers having at least one of: (i) a surface area of at least 5 $m^2/g$; (ii) porosity of at least 5% by volume; or (iii) a pore volume of at least 0.005 mL/g; and (b) an active agent incorporated into and/or applied onto at least a portion of the inorganic fibers.

Also provided are various product forms including the activated fiber compositions disclosed herein. The product forms may include, without limitation, fiber aggregates, composite materials, filter elements, catalytic elements, components of exhaust systems, catalytic support materials, papers, blankets, mats, felts, textiles, films, etc.

The activated fiber compositions and resulting product forms provide benefits as compared to conventional product forms. For example, ceramic honeycomb filters/catalyst supports may be heavy, prone to damage during handling and installation, have relatively low temperature tolerance, and may be relatively expensive. A filter element/catalytic element made from the activated fiber compositions disclosed herein may be lighter in weight, less prone to damage, have higher temperature tolerances, and/or be less expensive than the conventional ceramic honeycomb products. These benefits apply equally to other product forms disclosed herein, as well as to many product forms which could be made from the activated fiber compositions disclosed herein.

DESCRIPTION

With regard to compositional weight percentages disclosed herein, it will be understood that the total weight percent of a composition cannot exceed 100%. For example, a composition including 5% to 94% by weight of component X, greater than 0 to 55% by weight of component Y, and greater than 0 to 85% by weight of component Z, will not exceed 100% by weight, and that the amounts of each component will be adjusted to include the desired amount of each component without exceeding 100% by weight of the total composition.

It is to be understood that when a range of values is described in the present disclosure (such as, without limitation, "X to Y", "at least X", or "at most Y"), it is intended that any and every value within the range, including the endpoints, is considered as having been stated and disclosed as a possible value for the related characteristic, or as a possible alternative minimum and/or maximum of a narrower range (with the proviso, of course, that the minimum not exceed the maximum of any particular range). For example, a range of "1 to 10" is to be read as indicating each and every possible number along the continuum from 1 to 10. It is to be understood that the inventors appreciate and understand that any and all values within the range are to be considered as having been specified, and that the inventors have possession of the entire range and all values within the range. While alternative values and/or narrower ranges may be explicitly stated herein, the disclosure should not be construed as limited to only those values and/or ranges that are specifically disclosed, in accordance with the understandings described in this paragraph.

Porous Inorganic Fibers

The inorganic fibers may include one or more types of inorganic fibers, alone or in combination. Any inorganic fibers which are capable of being made porous and including an active agent, while maintaining their physical properties, may be used. In certain embodiments, the inorganic fibers may include at least one of inorganic oxide fibers, ceramic fibers, refractory ceramic fibers, polycrystalline wool fibers, alumina fibers, high alumina fibers, glass fibers, silica fibers, boehmite fibers, low-biopersistence fibers, alkaline earth silicate fibers, calcia-alumina fibers, zirconia fibers, or titania fibers.

In certain embodiments, the inorganic fibers may be produced by any known methods for producing inorganic fibers. In certain embodiments, the inorganic fibers may be produced via sol-gel processes. An exemplary sol-gel fiber production process includes:

Forming a solution or sol containing the proportions of the desired metal salts or compounds as needed.

Including in the solution or sol a spinning aid, such as an organic polymer, to provide the needed rheology for fiberization.

Including in the solution or sol any other materials deemed desirable for the finished product (including, but not limited, to: phase-change inhibitors or metal oxide powders for performance enhancement; at least one active agent as described herein; and/or dopants for improving adhesion of active agents to the inorganic fibers).

Fiberizing the resulting material from the solution or sol by established fiberization methods which may include but are not limited to:

Providing the solution or sol to a rotary disk, where it may be centrifugally extruded into fibers, referred to as "spinning";

Providing the solution or sol to an extrusion nozzle (or an assembly thereof) and extruding the solution or sol, with or without an attenuating air stream, as a continuous or discontinuous fiber; and Electrospinning.

Subjecting the resulting fibers to a drying and calcination step, to remove water, residual organic components, and volatile salt anions.

Subjecting the fibers to a further heat treatment to develop a crystal structure.

Any means may be used for spinning the liquid. For example, the spinning liquid may be placed in a centrifugal ejection spinning machine in the form of a cylinder having a plurality of nozzle orifices in its peripheral surface. Rotation of the spinning machine at a high speed causes the spinning solution to be ejected through the nozzle orifices into a drying atmosphere to convert the liquid into fibrous form. Thereafter the resulting fibrous material is dried to remove water and calcined, i.e., heated at a high temperature, e.g., between 700° C. and 1500° C. for silica fibers, to produce a polycrystalline fiber. The fibers may have a BET surface area on the order of 5 to 200 m$^2$/g, in certain embodiments in the range of 60 to 140 m$^2$/g, and a porosity of 5% to 60%.

Alternatively, the liquid may be placed in a container having nozzle orifices and allowed to fall onto a rapidly revolving disc located under the container. As a result, the falling spinning solution is blown off into a drying atmosphere and thereby spun or converted into fibrous form. The resulting fibers are dried and heated as previously discussed. In another example, the liquid is placed in a container having nozzle orifices and allowed to fall while supplying a high-speed gas stream in a transverse direction. As a result, the falling spinning solution is blown off into a drying atmosphere and thereby converted into fibrous form.

The solution may be heated to from 30° C. to 40° C. prior to forcing the solution through the openings. The prior heating permits rapid vaporization of the solvent thus more rapidly causing the oxide precursor to assume a fiber form.

These sol gel methods introduce controlled porosity by using an aqueous sol containing non-ionic surface-active agents such as siloxanes. This introduces micelles in the green fibers, which leave pores of controlled dimension in the final fired fiber structure.

In certain embodiments, the spinning temperature may be 25° C. and the surface-active agent may have a cloud point in the spinning solution of less than 45° C. As spinning temperature is increased, the acceptable cloud point of the surface-active agent increases. For example, for a spinning temperature of 50° C., the cloud point of the surface-active agent will be less than 70° C. In certain embodiments, the cloud point of the surface-active agent is at least 5° C. above the spinning temperature and not more than 15° C. above the spinning temperature.

The term "spinning temperature" as used herein means the maximum temperature which the spinning solution or sol attains during the extrusion and draw-down (extension) stages of the fiber-forming process. Thus, extrusion of solution or sol into a heated environment will result in a rise in temperature in the solution or sol during draw-down (extension) into green-fibers. The spinning temperature in such a case is the maximum temperature attained by the solution or sol (green-fibers) before draw-down (extension) is completed. The spinning temperature may be the wet bulb temperature of the attenuating air.

The "cloud point of the surface-active agent" referred to herein is the temperature at which the spinning solution containing the surface-active agent becomes cloudy when heated. Aqueous solutions of non-ionic surfactants become cloudy when heated, and the cloud point of these is determined by immersing a boiling tube containing 10 mls of the solution in a cool stirred water bath, and then heating the bath at a rate of 1° C. per minute. The solution in the tube is unstirred or stirred very gently (to avoid bubbles) with a spatula. The solution becomes cloudy over a narrow temperature range within 1-2° C., and the clouding temperature, or cloud point may then be noted.

Surface-active agents of several chemical types may be employed, and examples of such chemical types are alkylethoxylates, alkylphenyl-ethoxylates, polypropyleneoxide-polyethyleneoxide block copolymers, comb-type siloxane-polyethoxylate copolymers and polyethoxylated amines. It will be appreciated that within each of these chemical classes of surface-active agents there may be those which have a cloud point too high to be useful in the process as well as those which are useful in the process. It is, however, a matter of simple routine experiment to measure the cloud point of a surface-active agent to determine its suitability for use in the process. Blends or mixtures of surface-active agents may be employed to provide a suitable cloud point.

The amount of the surface-active agent used in the spinning solution may vary within a wide range but will usually be at least 1% by weight based on the spinning solution. The amount of the surface-active agent may be from 1% to 15% by weight of the solution; and in certain embodiments from 3% to 10% by weight of the solution.

The spinning solution or sol may contain precursors of stabilizing and/or sintering additives for the fibers in addition to the surface-active agent. In any embodiment, the surface-active agent may itself be a source of a phase stabilizer or sintering agent in the resulting fibers. For example, use of a siloxane copolymer as the surface-active agent leads to the formation of silica in the fibers when the latter are heated to decompose the silicon oxide precursor to silica constituting the fibers. A stabilizing agent of which precursors may be incorporated in the spinning solution or sol is therefore silica, such as silica sol, for silica fibers.

Calcination of the fiber precursor may start at a low temperature (e.g., 150° C.) and increases to a final high temperature condition (e.g., 700° C. to 1500° C.) to ensure that the fibers are heat resistant and/or have adequate mechanical strength. Different atmospheres inside the heat treatment furnace may be used to support the heat treatment process, such as by adding steam to the furnace. Using different heating rates (sometimes referred to as "ramp rate"), and/or holding a fixed temperature for a period of time, can affect the calcination process, such as by altering the concentration and size of crystallites in the fibers. U.S. Pat. No. 3,950,478 provides information in this regard, the entire disclosure of which is herein incorporated by reference.

The concentration and size of crystallites present in the finished inorganic fibers can also be controlled by adding crystal growth inhibitors and/or by addition of nucleation "seeds" which have a desired crystallography. In certain embodiments, this may include controlling the crystallographic composition to maintain porosity while ensuring surface energies are low and maximizing the surface acidity. Crystal growth inhibitors may include fine particles which prevent the motion of grain boundaries, and thus prevent the formation of large crystals (known as "Zener pinning"). In certain embodiments, particles of silica, magnesia, zirconia and/or yttria may be used as crystal growth inhibitors in alumina fibers. In certain embodiments, particles of alumina, magnesia and/or yttria may be used as crystal growth inhibitors in zirconia fibers. In certain embodiments, phosphates may be used as crystal growth inhibitors in titania fibers. Nucleation seeds having a desired crystallography may reduce the activation energy of the target crystal phase, thereby promoting preferential growth of the target crystal phase in the fiber during calcination. In certain embodiments, small concentrations of iron, copper and/or crystalline alumina may promote crystallographic growth in alumina fibers. In certain embodiments, small concentrations of rutile titania and/or thorite may promote crystallographic growth in zirconia fibers. In these embodiments, "small concentrations" may mean less than 1 percent by weight, such as 0.1% by weight or less.

In certain embodiments, the inorganic fibers may include ceramic fibers. Without limitation, suitable ceramic fibers include alumina fibers, alumino-silicate fibers, alumina-boria-silicate fibers, alumina-zirconia-silicate fibers, zirconia-silicate fibers, zirconia fibers and similar fibers. A suitable alumina-silicate ceramic fiber is commercially available from Unifrax I LLC (Tonawanda, N.Y., USA) under the registered trademark FIBERFRAX. The FIBERFRAX refractory ceramic fibers include the fiberization product of 45 to 75 weight percent alumina and 25 to 55 weight percent silica. The FIBERFRAX fibers exhibit operating temperatures of up to 1540° C. and a melting point up to 1870° C.

In certain embodiments, the alumino-silicate fibers may include: from 40 weight percent to 60 weight percent $Al_2O_3$ and from 60 weight percent to 40 weight percent $SiO_2$; 50 weight percent $Al_2O_3$ and 50 weight percent $SiO_2$; 30 weight percent $Al_2O_3$ and 70 weight percent $SiO_2$; from 45 to 51 weight percent $Al_2O_3$ and from 46 to 52 weight percent $SiO_2$; or from 30 to 70 weight percent $Al_2O_3$ and from 30 to 70 weight percent $SiO_2$.

In certain embodiments, the inorganic fibers may include an alumino-silica-magnesia glass fiber including from 64 weight percent to 66 weight percent $SiO_2$, from 24 weight percent to 25 weight percent $Al_2O_3$, and from 9 weight percent to 10 weight percent MgO.

Without limitation, suitable examples of low-biopersistence fibers include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,975, 5,821,183, and 5,811,360, the entire disclosures of which are incorporated herein by reference.

Suitable low-biopersistence fibers include, without limitation, alkaline earth silicate fibers, such as calcia-magnesia-silicate fibers or magnesia-silicate fibers, calcia-aluminate fibers, potassia-calcia-aluminate fibers, potassia-alumina-silicate fibers, or sodia-alumina-silicate fibers.

In certain embodiments, the alkaline earth silicate fibers may include the fiberization product of a mixture of oxides of magnesium and silica. These fibers are commonly referred to as magnesium-silicate fibers. The magnesium-silicate fibers may include the fiberization product of: from 60 to 90 weight percent silica, from greater than 0 to 35 weight percent magnesia and 5 weight percent or less impurities; from 65 to 86 weight percent silica, from 14 to 35 weight percent magnesia and 5 weight percent or less impurities; or from 70 to 86 weight percent silica, from 14 to 30 weight percent magnesia, and 5 weight percent or less impurities. A suitable magnesium-silicate fiber is commercially available from Unifrax I LLC (Tonawanda, N.Y.) under the registered trademark ISOFRAX. Commercially available ISOFRAX fibers generally include the fiberization product of from 70 to 80 weight percent silica, from 18 to 27 weight percent magnesia and 4 weight percent or less impurities. In certain embodiments, the fibers include the fiberization product of 85 weight percent silica and 15 weight percent magnesia.

In certain embodiments, the alkaline earth silicate fibers may include the fiberization product of a mixture of oxides of calcium, magnesium and silica. These fibers are commonly referred to as calcia-magnesia-silicate fibers. In certain embodiments, the calcia-magnesia-silicate fibers include the fiberization product of: from 45 to 90 weight percent silica, from greater than 0 to 45 weight percent calcia, from greater than 0 to 35 weight percent magnesia, and 10 weight percent or less impurities; or greater than 71.25 to 85 weight percent silica, greater than 0 to 20 weight percent magnesia, 5 to 28.75 weight percent calcia, and 0 to 5 weight percent zirconia.

Suitable calcia-magnesia-silicate fibers include those commercially available from Unifrax I LLC (Tonawanda, N.Y.) under the registered trademark INSULFRAX. In certain embodiments, the calcia-magnesia-silicate fibers include the fiberization product of: from 61 to 67 weight percent silica, from 27 to 33 weight percent calcia, and from 2 to 7 weight percent magnesia. In certain embodiments, the calcia-magnesia-silicate fibers include 79 weight percent silica, 18 weight percent calcia, and 3 weight percent magnesia. Other suitable calcia-magnesia-silicate fibers include those commercially available from Thermal Ceramics (Augusta, Ga.) under the trade designations SUPERWOOL 607, SUPERWOOL 607 MAX and SUPERWOOL HT. SUPERWOOL 607 fibers include from 60 to 70 weight percent silica, from 25 to 35 weight percent calcia, from 4 to 7 weight percent magnesia, and trace amounts of alumina. SUPERWOOL 607 MAX fibers include 60 to 70 weight percent silica, from 16 to 22 weight percent calcia, and from 12 to 19 weight percent magnesia, and trace amounts of alumina. SUPERWOOL HT fibers include 74 weight percent silica, 24 weight percent calcia and trace amounts of magnesia, alumina and iron oxide.

In certain embodiments, the alkaline earth silicate fibers may include the fiberization product of a mixture of oxides of calcium and aluminum. In certain embodiments, at least 90 weight percent of the calcia-aluminate fibers include the fiberization product of: from 50 to 80 weight percent calcia, from 20 to less than 50 weight percent alumina, and 10 weight percent or less impurities; or from 50 to 80 weight percent alumina, from 20 to less than 50 weight percent calcia, and 10 weight percent or less impurities. In certain embodiments, the alkaline earth silicate fibers may include the fiberization product of a mixture of oxides of potassium, calcium and aluminum ("potassia-calcia-aluminate fibers"). In certain embodiments, the potassia-calcia-aluminate fibers include the fiberization product of from 10 to 50 weight percent calcia, from 50 to 90 weight percent alumina, from greater than 0 to 10 weight percent potassia, and 10 weight percent or less impurities.

In certain embodiments, the alkaline earth silicate fibers may include the fiberization product of a mixture of oxides of magnesium, silica, lithium and strontium. In certain embodiments, the alkaline earth silicate fibers may include: 65 to 86 weight percent silica, 14 to 35 weight percent magnesia, lithium oxide and strontium oxide; or 65 to 86 weight percent silica, 14 to 35 weight percent magnesia, greater than 0 to 1 weight percent lithium oxide and greater than 0 to 5 weight percent strontium oxide.

In certain embodiments, the alkaline earth silicate fibers may include the fiberization product of a mixture of oxides of magnesium, silica, lithium and strontium. In certain embodiments, the alkaline earth silicate fibers include: 65 to 86 weight percent silica, 14 to 35 weight percent magnesia, lithium oxide and strontium oxide; 65 to 86 weight percent silica, 14 to 35 weight percent magnesia, greater than 0 to 1 weight percent lithium oxide and greater than 0 to 5 weight percent strontium oxide; 14 to 35 weight percent magnesia, and greater than 0 to 0.45 weight percent lithium oxide; 14 to 35 weight percent magnesia, and greater than 0 to 5 weight percent strontium oxide; or 70 or greater weight percent silica, magnesia, and greater than 0 to 10 weight percent iron oxide.

Suitable silica fibers include leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of 550 tex and are generally made from silicic acid modified by alumina. The BELCOTEX fibers are amorphous and generally contain 94.5 silica, 4.5 percent alumina, less than 0.5 percent sodium oxide, and less than 0.5 percent of other components. These fibers have an average fiber diameter of 9 microns and a melting point in the range of 1500° C. to 1550° C. These fibers are heat resistant to temperatures of up to 1100° C. and are typically shot free and binder free.

The REFRASIL fibers, like the BELCOTEX fibers, are amorphous leached glass fibers high in silica content for providing thermal insulation for applications in the 1000° C. to 1100° C. temperature range. These fibers are between 6 and 13 microns in diameter, and have a melting point of 1700° C. The fibers, after leaching, typically have a silica content of 95 percent by weight. Alumina may be present in an amount of 4 percent by weight with other components being present in an amount of 1 percent or less.

The PS-23 (R) fibers from Polotsk-Steklovolokno are amorphous glass fibers high in silica content and are suitable for thermal insulation in applications requiring resistance to at least 1000° C. These fibers have a fiber length in the range of 5 to 20 mm and a fiber diameter of 9 microns. These fibers, like the REFRASIL fibers, have a melting point of 1700° C.

In certain embodiments, the glass fibers may include the fiberization product of 63 to 67 weight percent $SiO_2$, 3 to 5 weight percent $Al_2O_3$, 4 to 7 weight percent CaO, 2 to 4 weight percent MgO, 4 to 7 weight percent $B_2O_3$, 14 to 17 weight percent $Na_2O$, greater than 0 to 2 weight percent $K_2O$, greater than 0 to 1 weight percent ZnO, greater than 0 to 1 weight percent $Fe_2O_3$, greater than 0 to 1 weight percent BaO, and greater than 0 to 1 weight percent $F_2$.

In certain embodiments, the glass fibers may include E-glass fibers. E-glass fibers may include from 52 weight percent to 56 weight percent $SiO_2$, from 16 weight percent to 25 weight percent CaO, from 12 weight percent to 16 weight percent $Al_2O_3$, from 5 weight percent to 10 weight percent $B_2O_3$, up to 5 weight percent MgO, up to 2 weight percent of sodium oxide and potassium oxide and trace amounts of iron oxide and fluorides, e.g., a composition of 55 weight percent $SiO_2$, 15 weight percent $Al_2O_3$, 7 weight percent $B_2O_3$, 3 weight percent MgO, 19 weight percent CaO and traces of the above mentioned materials.

Suitable glass fibers having physical properties such as high specific surface area, high tensile strength, consistent glass chemistry and purity are available from Unifrax Specialty Fibers (Tonawanda N.Y.). These fibers are produced by rotary and flame attenuation manufacturing processes. Average fiber diameters range from an extremely fine 0.25 μm to 5.0 μm. Examples of glass fiber compositions are set forth in TABLE 1 below.

TABLE 1

| Glass Fiber Compositions (% by weight) | | | | |
|---|---|---|---|---|
| | Glass A | Glass B | Glass C | Glass E |
| $SiO_2$ | 68.0-71.0 | 55.0-60.0 | 63.0-67.0 | 50.0-56.0 |
| $Al_2O_3$ | 2.5-4.0 | 4.0-7.0 | 3.0-5.0 | 13.0-16.0 |
| $B_2O_3$ | <0.09* | 8.0-11.0 | 4.0-7.0 | 5.8-10.0 |
| $Na_2O$ | 10.5-12.0 | 9.5-13.5 | 14.0-17.0 | <0.50 |
| $K_2O$ | 4.5-6.0 | 1.8-4.0 | <2.0 | <0.40 |
| CaO | 5.0-7.0 | 2.8-5.0 | 4.0-7.0 | 15.0-24.0 |
| MgO | 2.0-4.0 | <2.0 | 2.0-4.0 | <5.5 |
| $Fe_2O_3$ | <0.20 | <0.20 | <0.20 | <0.50 |

TABLE 1-continued

| Glass Fiber Compositions (% by weight) | | | | |
|---|---|---|---|---|
| | Glass A | Glass B | Glass C | Glass E |
| ZnO | <2.0 | 2.0-5.0 | <0.10 | <0.02 |
| BaO | — | 3.0-6.0 | <0.10 | <0.03 |
| $F_2$ | — | <1.0 | <1.0 | <1.0 |
| $TiO_2$ | — | — | — | <1.0 |

*$B_2O_3$ contains 31.1% boron by weight. The maximum allowable boron content in A-Glass is 0.028%.

Glass fibers may be converted into a high silica fiber by extracting therefrom the monovalent, divalent, and trivalent glass-forming metal oxide constituents to leave a fiber composed essentially of silica and containing a ratio of less than 10 parts of such metal oxides to 90 parts of $SiO_2$ and even as low as 1 or 2 parts of such oxides, the remaining oxide portion being $SiO_2$. This is accomplished by leaching the fibers, either in loose masses or in fabricated form with acids, other than phosphorous or phosphoric acid, which attack $SiO_2$, for a time and at a temperature sufficient to extract substantially all of the oxides other than silica. The treated fibers are then washed substantially free of acid and may be heated at an elevated temperature to dehydrate and shrink the fibers, if desired. The above process results in shrinkage of fibers both in diameter and longitudinally.

Suitable leaching acids include for example, HCl, $H_2SO_4$, $HNO_3$, acetic, chloroacetic, and chlorinated low molecular weight fatty acids, for example, trichloroacetic acid. The strength of the acid may be varied over a wide range, for example from 0.1 N to 5 N or higher. The leaching process may take place at elevated temperature ranging from 100° F. up to the boiling point of the acid, or above the boiling point by conducting the leaching in an autoclave under superatmospheric pressure.

It may be desirable to shrink the fibers by dehydration at elevated temperatures for a time sufficient to remove substantially all of the water of hydration and all adsorbed water, by heating, such as to a temperature of 400° F. to 500° F. for a time sufficient to remove water of hydration and adsorbed water without materially shrinking the fibers.

Borosilicate glass fibers may be readily leached with acid to remove the metal oxides other than silica, and may be dehydrated by heating to temperatures of above 1000° F., preferably in the range of 1400° F. to 1600° F. By proper control of the acid extraction process, the resultant fibers after firing contain a high silica content and may be as high as 90% or 99.9% silica as determined by a hydrofluoric acid extraction method.

Methods for the preparation of silica fibers are disclosed in U.S. Pat. Nos. 2,215,039, 2,221,709, 2,461,841, 2,491,761, 2,500,092, 2,624,658, 2,635,390, 2,686,954, 2,718,461, and 2,730,475, the entire disclosures of which are incorporated herein by reference.

In certain embodiments, the inorganic fibers may include refractory ceramic fibers including the fiberization product of 45 to 75 weight percent alumina and 25 to 55 weight percent silica.

In certain embodiments, the inorganic fibers may include alkaline earth silicate fibers including the fiberization product of 60 to 90 weight percent silica, greater than 0 to 35 weight percent magnesia, and 5 weight percent or less impurities.

In certain embodiments, the inorganic fibers may include alkaline earth silicate fibers including the fiberization product of 45 to 90 weight percent silica, greater than 0 to 45 weight percent calcia, greater than 0 to 35 weight percent magnesia, and 10 weight percent or less impurities.

In certain embodiments, the inorganic fibers may include alkaline earth silicate fibers including the fiberization product of calcia and silica.

In certain embodiments, the inorganic fibers may include calcia-alumina fibers including 20 to 80 weight percent calcia and 20 to 80 weight percent alumina.

In certain embodiments, the inorganic fibers may include silica fibers including 90 weight percent or greater silica.

In certain embodiments, the inorganic fibers may include alumina fibers including 90 weight percent or greater alumina.

In certain embodiments, the inorganic fibers may include polycrystalline wool fibers including the fiberization product of 95 to 97 weight percent alumina and 3 to 5 weight percent silica.

In certain embodiments, the inorganic fibers may be present in the activated fiber composition in an amount of 20 to 100 percent by weight, based on the total weight of the activated fiber composition. In embodiments in which the inorganic fibers include an active agent incorporated into the inorganic fibers, such inorganic fibers may include up to 100 percent by weight of the activated fiber composition, based on the total weight of the activated fiber composition. In certain embodiments, the inorganic fibers may be present in the activated fiber composition in an amount such that the amount of inorganic fiber present in the activated fiber composition and the amount of active agent present in the activated fiber composition together equal the entire weight of the activated fiber composition. In certain embodiments, the inorganic fibers may be present in the activated fiber composition in an amount such that the amount of inorganic fiber present in the activated fiber composition, the amount of active agent present in the activated fiber composition, and the amount of any other components described herein present in the composition together equal the entire weight of the activated fiber composition.

In certain embodiments, the inorganic fibers may be present in the activated fiber composition in an amount, based on the total weight of the activated fiber composition, of 20 to 99 percent by weight, 20 to 98 percent by weight, 20 to 97 percent by weight, 20 to 96 percent by weight, 20 to 95 percent by weight, 20 to 94 percent by weight, 20 to 93 percent by weight, 20 to 92 percent by weight, 20 to 91 percent by weight, 20 to 90 percent by weight, 20 to 85 percent by weight, 20 to 80 percent by weight, 20 to 75 percent by weight, 20 to 70 percent by weight, 20 to 65 percent by weight, 20 to 60 percent by weight, 20 to 55 percent by weight, or 20 to 50 percent by weight.

In certain embodiments, the inorganic fibers may be present in the activated fiber composition in an amount, based on the total weight of the activated fiber composition, of 25 to 99 percent by weight, 25 to 98 percent by weight, 25 to 97 percent by weight, 25 to 96 percent by weight, 25 to 95 percent by weight, 25 to 94 percent by weight, 25 to 93 percent by weight, 25 to 92 percent by weight, 25 to 91 percent by weight, 25 to 90 percent by weight, 25 to 85 percent by weight, 25 to 80 percent by weight, 25 to 75 percent by weight, 25 to 70 percent by weight, 25 to 65 percent by weight, 25 to 60 percent by weight, 25 to 55 percent by weight, or 25 to 50 percent by weight.

In certain embodiments, the inorganic fibers may be present in the activated fiber composition in an amount, based on the total weight of the activated fiber composition, of 30 to 99 percent by weight, 30 to 98 percent by weight, 30 to 97 percent by weight, 30 to 96 percent by weight, 30 to 95 percent by weight, 30 to 94 percent by weight, 30 to 93 percent by weight, 30 to 92 percent by weight, 30 to 91 percent by weight, 30 to 90 percent by weight, 30 to 85 percent by weight, 30 to 80 percent by weight, 30 to 75 percent by weight, 30 to 70 percent by weight, 30 to 65 percent by weight, 30 to 60 percent by weight, 30 to 55 percent by weight, or 30 to 50 percent by weight.

In certain embodiments, the inorganic fibers may be present in the activated fiber composition in an amount, based on the total weight of the activated fiber composition, of 35 to 99 percent by weight, 35 to 98 percent by weight, 35 to 97 percent by weight, 35 to 96 percent by weight, 35 to 95 percent by weight, 35 to 94 percent by weight, 35 to 93 percent by weight, 35 to 92 percent by weight, 35 to 91 percent by weight, 35 to 90 percent by weight, 35 to 85 percent by weight, 35 to 80 percent by weight, 35 to 75 percent by weight, 35 to 70 percent by weight, 35 to 65 percent by weight, 35 to 60 percent by weight, 35 to 55 percent by weight, or 35 to 50 percent by weight.

In certain embodiments, the inorganic fibers may be present in the composition in an amount, based on the total weight of the activated fiber composition, of 40 to 99 percent by weight, 40 to 98 percent by weight, 40 to 97 percent by weight, 40 to 96 percent by weight, 40 to 95 percent by weight, 40 to 94 percent by weight, 40 to 93 percent by weight, 40 to 92 percent by weight, 40 to 91 percent by weight, 40 to 90 percent by weight, 40 to 85 percent by weight, 40 to 80 percent by weight, 40 to 75 percent by weight, 40 to 70 percent by weight, 40 to 65 percent by weight, 40 to 60 percent by weight, 40 to 55 percent by weight, or 40 to 50 percent by weight.

In certain embodiments, the inorganic fibers may be present in the activated fiber composition in an amount, based on the total weight of the activated fiber composition, of 45 to 99 percent by weight, 45 to 98 percent by weight, 45 to 97 percent by weight, 45 to 96 percent by weight, 45 to 95 percent by weight, 45 to 94 percent by weight, 45 to 93 percent by weight, 45 to 92 percent by weight, 45 to 91 percent by weight, 45 to 90 percent by weight, 45 to 85 percent by weight, 45 to 80 percent by weight, 45 to 75 percent by weight, 45 to 70 percent by weight, 45 to 65 percent by weight, 45 to 60 percent by weight, 45 to 55 percent by weight, or 45 to 50 percent by weight.

In certain embodiments, the inorganic fibers may be present in the activated fiber composition in an amount, based on the total weight of the composition, of 50 to 99 percent by weight, 50 to 98 percent by weight, 50 to 97 percent by weight, 50 to 96 percent by weight, 50 to 95 percent by weight, 50 to 94 percent by weight, 50 to 93 percent by weight, 50 to 92 percent by weight, 50 to 91 percent by weight, 50 to 90 percent by weight, 50 to 85 percent by weight, 50 to 80 percent by weight, 50 to 75 percent by weight, 50 to 70 percent by weight, 50 to 65 percent by weight, 50 to 60 percent by weight, or 50 to 55 percent by weight.

In certain embodiments, the inorganic fibers may include first inorganic fibers and second inorganic fibers. The first inorganic fibers may have a porosity which is different from the porosity of the second inorganic fibers. The first inorganic fibers may have a mean fiber diameter which is different from the mean fiber diameter of the second inorganic fibers. The first inorganic fibers may have a mean fiber length which is different from the mean fiber length of the second inorganic fibers. The first inorganic fibers may have a composition which is different from the composition of the second inorganic fibers.

In certain embodiments, the inorganic fibers have a median fiber diameter of 0.25 to 20 µm, 0.25 to 18 µm, 0.25 to 16 µm, 0.25 to 14 µm, 0.25 to 12 µm, 0.25 to 10 µm, 0.25 to 9 µm, 0.25 to 8 µm, 0.25 to 7 µm, 0.25 to 6 µm, or 0.25 to 5 µm.

In certain embodiments, the inorganic fibers have a median fiber diameter of 0.5 to 20 µm, 0.5 to 18 µm, 0.5 to 16 µm, 0.5 to 14 µm, 0.5 to 12 µm, 0.5 to 10 µm, 0.5 to 9 µm, 0.5 to 8 µm, 0.5 to 7 µm, 0.5 to 6 µm, or 0.5 to 5 µm.

In certain embodiments, the inorganic fibers have a median fiber diameter of 1 to 20 µm, 1 to 18 µm, 1 to 16 µm, 1 to 14 µm, 1 to 12 µm, 1 to 10 µm, 1 to 9 µm, 1 to 8 µm, 1 to 7 µm, 1 to 6 µm, or 1 to 5 µm.

In certain embodiments, the inorganic fibers have a median fiber diameter of 1.5 to 20 µm, 1.5 to 18 µm, 1.5 to 16 µm, 1.5 to 14 µm, 1.5 to 12 µm, 1.5 to 10 µm, 1.5 to 9 µm, 1.5 to 8 µm, 1.5 to 7 µm, 1.5 to 6 µm, or 1.5 to 5 µm.

In certain embodiments, the inorganic fibers have a median fiber diameter of 2 to 20 µm, 2 to 18 µm, 2 to 16 µm, 2 to 14 µm, 2 to 12 µm, 2 to 10 µm, 2 to 9 µm, 2 to 8 µm, 2 to 7 µm, 2 to 6 µm, or 2 to 5 µm.

In certain embodiments, the inorganic fibers have a median fiber diameter of 2.5 to 20 µm, 2.5 to 18 µm, 2.5 to 16 µm, 2.5 to 14 µm, 2.5 to 12 µm, 2.5 to 10 µm, 2.5 to 9 µm, 2.5 to 8 µm, 2.5 to 7 µm, 2.5 to 6 µm, or 2.5 to 5 µm.

In certain embodiments, the inorganic fibers have a median fiber diameter of 3 to 20 µm, 3 to 18 µm, 3 to 16 µm, 3 to 14 µm, 3 to 12 µm, 3 to 10 µm, 3 to 9 µm, 3 to 8 µm, 3 to 7 µm, 3 to 6 µm, or 3 to 5 µm.

The standard deviation of the median fiber diameter may be 2 µm or less, 1.8 µm or less, 1.6 µm or less, 1.4 µm or less, 1.2 µm or less, 1 µm or less, 0.9 µm or less, 0.8 µm or less, 0.7 µm or less, 0.6 µm or less, or 0.5 µm or less.

In some embodiments, the activated fiber composition may be formed of low respirable fibers, i.e., the activated fiber composition may contain less than 0.1 percent by weight of fibers having a diameter less than 3 µm. In some embodiments, the inorganic fibers have a median fiber diameter of 3 to 5 µm and less than 0.1 percent by weight of the inorganic fibers have a diameter of less than 3 µm.

In certain embodiments, the inorganic fibers may have a melting point of 500° C. or greater, 600° C. or greater, 700° C. or greater, 800° C. or greater, 900° C. or greater, 1000° C. or greater, 1100° C. or greater, 1200° C. or greater, 1300° C. or greater, 1400° C. or greater, 1500° C. or greater, 1600° C. or greater, 1700° C. or greater, 1800° C. or greater, 1900° C. or greater, or 2000° C. or greater. In certain embodiments, the inorganic fibers are stable at a temperature of 500° C. or greater, 600° C. or greater, 700° C. or greater, 800° C. or greater, 900° C. or greater, 1000° C. or greater, 1100° C. or greater, 1200° C. or greater, or 1300° C. or greater. The inorganic fibers being "stable" at a specific temperature means that after being heated to the temperature for 30 minutes, the pore size and surface area are within 5% of pre-heating measurements.

In the process for the production of suitable inorganic fibers, porosity may be introduced into the fiber structure by the inclusion of a non-ionic surface-active agent in the solution phase containing the precursor metal salts, as described in more detail below and in European Patent Application 0 318 203 and U.S. Pat. No. 5,176,857, the entire disclosures of which are incorporated herein by reference. Examples of surface active agents include alkylethoxylates, alkylphenylethoxylates, polypropyleneoxide-polyethyleneoxide block copolymers, comb-type siloxane-polyethoxylate copolymers and polyethoxylated amines. By controlling the addition of the surface-active agent and the resulting micelle size in the solution or sol, the volume and dimensions of pores in the fibrous product can be directly controlled. Pore sizes may be controlled down to levels of tens of Angstroms. The presence of porosity drives the surface-area-to-volume ratio to a higher value than that of the fiber alone.

In certain embodiments, the inorganic fibers may have at least one of: (i) a surface area of at least 15 $m^2/g$; (ii) a porosity of at least 10% by volume; or (iii) a pore volume of at least 0.01 mL/g.

In certain embodiments, the inorganic fibers may have at least one of: (i) a surface area of at least 30 $m^2/g$; (ii) a porosity of at least 15% by volume; or (iii) a pore volume of at least 0.03 mL/g.

In certain embodiments, the inorganic fibers may have at least one of: (i) a surface area of at least 45 $m^2/g$; (ii) a porosity of at least 20% by volume; or (iii) a pore volume of at least 0.05 mL/g.

In certain embodiments, the inorganic fibers may have at least one of: (i) a surface area of at least 60 $m^2/g$; (ii) a porosity of at least 25% by volume; or (iii) a pore volume of at least 0.07 mL/g.

In certain embodiments, the inorganic fibers may have at least one of: (i) a surface area of at least 75 $m^2/g$; (ii) a porosity of at least 30% by volume; or (iii) a pore volume of at least 0.09 mL/g.

In certain embodiments, the inorganic fibers may have at least one of: (i) a surface area of at least 90 $m^2/g$; (ii) a porosity of at least 35% by volume; or (iii) a pore volume of at least 0.1 mL/g.

In certain embodiments, the inorganic fibers may have at least one of: (i) a surface area of 5 to 220 $m^2/g$; (ii) a porosity of 5% to 60% by volume; or (iii) a pore volume of 0.005 to 0.25 mL/g.

In certain embodiments, the inorganic fibers may have at least one of: (i) a surface area of 90 to 220 $m^2/g$; (ii) a porosity of 35% to 60% by volume; or (iii) a pore volume of 0.1 to 0.25 mL/g.

In certain embodiments, the inorganic fibers may have a surface area of at least 5 $m^2/g$, at least 15 $m^2/g$, at least 30 $m^2/g$, at least 45 $m^2/g$, at least 60 $m^2/g$, at least 75 $m^2/g$, or at least 90 $m^2/g$.

In certain embodiments, the inorganic fibers may have a surface area of at most 220 $m^2/g$, at most 200 $m^2/g$, at most 180 $m^2/g$, at most 160 $m^2/g$, at most 140 $m^2/g$, at most 120 $m^2/g$, or at most 100 $m^2/g$.

In certain embodiments, the inorganic fibers may have a surface area of 5 to 220 $m^2/g$, 5 to 200 $m^2/g$, 5 to 180 $m^2/g$, 5 to 160 $m^2/g$, 5 to 140 $m^2/g$, 5 to 120 $m^2/g$, or 5 to 100 $m^2/g$.

In certain embodiments, the inorganic fibers may have a surface area of 15 to 220 $m^2/g$, 15 to 200 $m^2/g$, 15 to 180 $m^2/g$, 15 to 160 $m^2/g$, 15 to 140 $m^2/g$, 15 to 120 $m^2/g$, or 15 to 100 $m^2/g$.

In certain embodiments, the inorganic fibers may have a surface area of 30 to 220 $m^2/g$, 30 to 200 $m^2/g$, 30 to 180 $m^2/g$, 30 to 160 $m^2/g$, 30 to 140 $m^2/g$, 30 to 120 $m^2/g$, or 30 to 100 $m^2/g$.

In certain embodiments, the inorganic fibers may have a surface area of 45 to 220 $m^2/g$, 45 to 200 $m^2/g$, 45 to 180 $m^2/g$, 45 to 160 $m^2/g$, 45 to 140 $m^2/g$, 45 to 120 $m^2/g$, or 45 to 100 $m^2/g$.

In certain embodiments, the inorganic fibers may have a surface area of 60 to 220 $m^2/g$, 60 to 200 $m^2/g$, 60 to 180 $m^2/g$, 60 to 160 $m^2/g$, 60 to 140 $m^2/g$, 60 to 120 $m^2/g$, or 60 to 100 $m^2/g$.

In certain embodiments, the inorganic fibers may have a surface area of 75 to 220 m²/g, 75 to 200 m²/g, 75 to 180 m²/g, 75 to 160 m²/g, 75 to 140 m²/g, 75 to 120 m²/g, or 75 to 100 m²/g.

In certain embodiments, the inorganic fibers may have a surface area of 90 to 220 m²/g, 90 to 200 m²/g, 90 to 180 m²/g, 90 to 160 m²/g, 90 to 140 m²/g, 90 to 120 m²/g, or 90 to 100 m²/g.

In certain embodiments, the inorganic fibers may have porosity of at least 5% by volume, at least 10% by volume, at least 15% by volume, at least 20% by volume, at least 30% by volume, or at least 35% by volume.

In certain embodiments, the inorganic fibers may have porosity of at most 60%, at most 55%, at most 50%, at most 45%, or at most 40%.

In certain embodiments, the inorganic fibers may have porosity of from 5% to 60%, 5% to 55%, 5% to 50%, 5% to 45%, or 5% to 40%.

In certain embodiments, the inorganic fibers may have porosity of from 10% to 60%, 10% to 55%, 10% to 50%, 10% to 45%, or 10% to 40%.

In certain embodiments, the inorganic fibers may have porosity of from 15% to 60%, 15% to 55%, 15% to 50%, 15% to 45%, or 15% to 40%.

In certain embodiments, the inorganic fibers may have porosity of from 20% to 60%, 20% to 55%, 20% to 50%, 20% to 45%, or 20% to 40%.

In certain embodiments, the inorganic fibers may have porosity of from 25% to 60%, 25% to 55%, 25% to 50%, 25% to 45%, or 25% to 40%.

In certain embodiments, the inorganic fibers may have porosity of from 30% to 60%, 30% to 55%, 30% to 50%, 30% to 45%, or 30% to 40%.

In certain embodiments, the inorganic fibers may have porosity of from 35% to 60%, 35% to 55%, 35% to 50%, 35% to 45%, or 35% to 40%.

In certain embodiments, the inorganic fibers may have a pore volume of at least 0.005 mL/g, at least 0.01 mL/g, at least 0.03 mL/g, at least 0.05 mL/g, at least 0.07 mL/g, at least 0.09 mL/g, or at least 0.1 mL/g.

In certain embodiments, the inorganic fibers may have a pore volume of at most 0.25 mL/g, at most 0.2 mL/g, at most 0.18 mL/g, at most 0.16 mL/g, at most 0.14 mL/g, or at most 0.12 mL/g.

In certain embodiments, the inorganic fibers may have a pore volume of 0.005 mL/g to 0.25 mL/g, 0.005 to 0.2 mL/g, 0.005 to 0.18 mL/g, 0.005 to 0.16 mL/g, 0.005 to 0.14 mL/g, or 0.005 to 0.12 mL/g.

In certain embodiments, the inorganic fibers may have a pore volume of 0.01 mL/g to 0.25 mL/g, 0.01 to 0.2 mL/g, 0.01 to 0.18 mL/g, 0.01 to 0.16 mL/g, 0.01 to 0.14 mL/g, or 0.01 to 0.12 mL/g.

In certain embodiments, the inorganic fibers may have a pore volume of 0.03 mL/g to 0.25 mL/g, 0.03 to 0.2 mL/g, 0.03 to 0.18 mL/g, 0.03 to 0.16 mL/g, 0.03 to 0.14 mL/g, or 0.03 to 0.12 mL/g.

In certain embodiments, the inorganic fibers may have a pore volume of 0.05 mL/g to 0.25 mL/g, 0.05 to 0.2 mL/g, 0.05 to 0.18 mL/g, 0.05 to 0.16 mL/g, 0.05 to 0.14 mL/g, or 0.05 to 0.12 mL/g.

In certain embodiments, the inorganic fibers may have a pore volume of 0.07 mL/g to 0.25 mL/g, 0.07 to 0.2 mL/g, 0.07 to 0.18 mL/g, 0.07 to 0.16 mL/g, 0.07 to 0.14 mL/g, or 0.07 to 0.12 mL/g.

In certain embodiments, the inorganic fibers may have a pore volume of 0.09 mL/g to 0.25 mL/g, 0.09 to 0.2 mL/g, 0.09 to 0.18 mL/g, 0.09 to 0.16 mL/g, 0.09 to 0.14 mL/g, or 0.09 to 0.12 mL/g.

In certain embodiments, the inorganic fibers may have a pore volume of 0.1 mL/g to 0.25 mL/g, 0.1 to 0.2 mL/g, 0.1 to 0.18 mL/g, 0.1 to 0.16 mL/g, 0.1 to 0.14 mL/g, or 0.1 to 0.12 mL/g.

In certain embodiments, the inorganic fibers may have a mean pore radius of 20 to 300 Å, 50 to 300 Å, 50 to 250 Å, 50 to 200 Å, 50 to 150 Å, 100 to 200 Å, 100 to 150 Å, or 150 to 200 Å.

In certain embodiments, the inorganic fibers may have a pore diameter distribution of 10 to 200 Å, 50 to 200 Å, 100 to 200 Å, 150 to 200 Å, 10 to 150 Å, 50 to 150 Å, 10 to 100 Å, 10 to 50 Å, 50 to 100 Å, or 100 to 150 Å.

It has been found that the "skeletal" architecture of porous systems (e.g., pore diameter, pore length, pore depth and/or surface area) may have an influence on the effectiveness of a catalytic process. Pores should be wide enough to allow a thin coverage of active material, and for target reactants to freely enter and exit the structure. If pores are too long and/or deep, reactants may become trapped, which reduces effectiveness. Thus, it may be particularly desirable to provide porosity preferentially located at the surface of the inorganic fibers, to limit the length and/or depth of the pores, and/or to adjust the pore diameter.

Controlling porosity may be done using a number of different process variables. Combining different surface-active agents in solutions, e.g., siloxane components having different micelle sizes or different functional groups, may provide pore size/distribution control. Altering the temperature and/or humidity during fiberization and/or drying may affect porosity, as may increasing or decreasing the concentration of solvents in the precursor fiber before heat treatment. Altering calcination conditions, as described above, may also affect porosity.

Surface area may be maximized by reducing the median diameter of the inorganic fibers. The fiber production processes described above can be tailored to provide inorganic fibers having a median diameter within a range of 0.25 μm to 20 μm, with a standard deviation below 2 μm, or even below 1 μm. Non-limiting examples of methods to control the median fiber diameter include the following: Using different doping aids as described above, such as at least one of polyvinyl alcohols, polyacrylamides (such as partially hydrolysed polyacrylamide), polyacrylic acids, polyethylene oxides, carboxyalkyl celluloses, hydroxyalkyl celluloses, alkyl celluloses, hydrolysed starches, dextrans, guar gum, polyvinyl pyrrolidones, polyethylene glycols, alginic acids, polyisobutylene derivatives, copolymers of polysiloxanes, polyethylene oxide, polyurethanes, or esters, and including mixtures, different molecular weights and concentrations of each of these species; depending on the doping aid, the median fiber diameter may be increased or decreased. Reducing the viscosity of the fiberization solution may result in fibers having a decreased median fiber diameter, as will reducing the aperture size of the fiberization nozzles in a fiberization spinner, reducing the flow rate through the nozzles, and increasing the rotational speed of the fiberization spinner or increasing air pressure in fiberization extrusion processes.

In certain embodiments, at least 25%, and in further embodiments a much higher proportion than 25%, of the total porosity in the fibers is provided by axially-aligned pores. The term "axially-aligned pores" as used herein is not limited to pores which are oriented truly parallel to the axis of the fiber but includes some pores oriented at an angle to the axis of up to 30 degrees. In certain embodiments, the majority of the axially-aligned pores may be essentially parallel to the axis and in particular deviate no more than 10 degrees from the axis. It is to be understood also that pores having an axially-aligned portion and a non-axially aligned portion, such as a radially-aligned portion (e.g. a labyrinthine pore including an axial pore in communication with a radial pore), are deemed to be axially-aligned pores in respect of that portion thereof which is axially aligned. Thus, the axially-aligned pores may be closed pores, or they may be open to the fiber surface.

The aligned pore structure of the fibers may be created by proper structuring within the gel fibers, that is the green fibers formed prior to heat treatment to convert the silica precursor into the inorganic silica of the fibers, in the case of silica fibers. Particular spinning conditions are needed to generate the desired structure in the gel fibers. Staple spinning processes draw the fibers rapidly to a fine diameter and in consequence the viscosity of the spinning solution or sol increases rapidly and uniformly across the fiber cross-section whilst the gel fiber is being drawn and subjected to extensional stresses. The combination of rapidly increasing viscosity and high spin/draw ratio provides flow forces of sufficient intensity and duration to create the desired gel fiber structure. Blow spinning operated under the right conditions offer an overall spin/draw ratio of from 500 to 2,500, where the overall spin/draw ratio is the ratio between the velocity of the gel fibers and the velocity of the spinning solution or sol in the spinneret holes.

Active Agents

As used herein, the term "active agent" refers to any composition or material which chemically alters an undesirable component in a fluid and/or adsorbs an undesirable component from a fluid, and which is capable of being incorporated into and/or applied onto inorganic fibers.

By "incorporated into" the inorganic fibers, what is meant is that the active agent is added to the inorganic fibers during production of the inorganic fibers, such as by adding the active agent to the sol-gel material which is used to produce the fibers. The active agent therefore forms an integral component of the inorganic fibers. The active agent may therefore be present homogenously throughout each individual fiber, or, via specific processing techniques, may be present in higher concentrations in certain portions of each inorganic fiber, such as at a higher concentration near the surface of each inorganic fiber.

By "applied onto" the inorganic fibers, what is meant is that the active agent is applied to the inorganic fibers at some point subsequent to forming green inorganic fibers. For example, but without limitation, the active agent may be added to the inorganic fibers immediately after the green inorganic fibers are formed, such as immediately after the spinning step of the sol-gel process. This may be accomplished by spraying a liquid form of the active agent onto the fibers at this stage. Additionally, or alternatively, a non-limiting example includes coating the active agent onto the inorganic fibers after completion of the inorganic fiber production process, such as by spraying a liquid form of the active agent, or otherwise coating the active agent, onto the inorganic fibers. The active agent may additionally or alternatively be applied before, during or after any suitable step of the inorganic fiber production process.

In certain embodiments, the active agent may include at least one of: a catalytically-active agent; or a gas-capture agent.

In certain embodiments, the catalytically-active agent may include at least one of platinum, rubidium, antimony, copper, silver, palladium, ruthenium, bismuth, zinc, nickel, cobalt, chromium, cerium, titanium, iron, vanadium, gold or manganese, in element and/or compound form. In certain embodiments, if the catalytically-active agent is in compound form, the compound may include one or more than one of these elements.

In certain embodiments, the gas-capture agent may include at least one of: a carbon dioxide capturing agent; a nitrogen oxide (NOx) capturing agent; or a sorbent for trace metals (such as lead or cadmium). The carbon dioxide capturing agent may include calcium oxide. The nitrogen oxide (NOx) capturing agent may include at least one barium-containing compound, such as barium oxide, barium hydroxide, barium carbonate, or mixtures thereof. In certain embodiments, the barium-containing compound may be supported on a ceramic material, such as gamma-alumina. The sorbent for trace metals may include an alumino-silicate compound. In this context, what is meant by alumino-silicate compound are compounds which may range from pure alumina to pure silica. In certain embodiments, the alumino-silicate composition may include silica, kaolin, bauxite, diatomaceous earth, magnesium hydroxide silicates, alumina, or mixtures thereof.

In certain embodiments, the active agent may be present in the activated fiber composition in an amount of greater than 0 to 50 percent by weight, based on the total weight of the activated fiber composition. In certain embodiments, the active agent may be present in the activated fiber composition in an amount such that the amount of the active agent present in the activated fiber composition and the amount of inorganic fibers present in the activated fiber composition together equal the entire weight of the activated fiber composition. In certain embodiments, the active agent may be present in the activated fiber composition in an amount such that the amount of active agent present in the activated fiber composition, the amount of inorganic fibers present in the activated fiber composition, and the amount of any other components described herein present in the activated fiber composition together equal the entire weight of the activated fiber composition.

In certain embodiments, the active agent may be present in the activated fiber composition in an amount, based on the total weight of the activated fiber composition of 0.01 to 50 percent by weight, 0.05 to 50 percent by weight, 0.1 to 50 percent by weight, 0.5 to 50 percent by weight, 1 to 50 percent by weight, 2 to 50 percent by weight, 3 to 50 percent by weight, 4 to 50 percent by weight, 5 to 50 percent by weight, 6 to 50 percent by weight, 7 to 50 percent by weight, 8 to 50 percent by weight, 9 to 50 percent by weight, or 10 to 50 percent by weight.

In certain embodiments, the active agent may be present in the activated fiber composition in an amount, based on the total weight of the activated fiber composition, of 0.01 to 45 percent by weight, 0.05 to 45 percent by weight, 0.1 to 45 percent by weight, 0.5 to 45 percent by weight, 1 to 45 percent by weight, 2 to 45 percent by weight, 3 to 45 percent by weight, 4 to 45 percent by weight, 5 to 45 percent by weight, 6 to 45 percent by weight, 7 to 45 percent by weight, 8 to 45 percent by weight, 9 to 45 percent by weight, or 10 to 45 percent by weight.

In certain embodiments, the active agent may be present in the activated fiber composition in an amount, based on the total weight of the activated fiber composition, of 0.01 to 40 percent by weight, 0.05 to 40 percent by weight, 0.1 to 40 percent by weight, 0.5 to 40 percent by weight, 1 to 40 percent by weight, 2 to 40 percent by weight, 3 to 40 percent by weight, 4 to 40 percent by weight, 5 to 40 percent by weight, 6 to 40 percent by weight, 7 to 40 percent by weight, 8 to 40 percent by weight, 9 to 40 percent by weight, or 10 to 40 percent by weight.

In certain embodiments, the active agent may be present in the activated fiber composition in an amount, based on the total weight of the activated fiber composition, of 0.01 to 35 percent by weight, 0.05 to 35 percent by weight, 0.1 to 35 percent by weight, 0.5 to 35 percent by weight, 1 to 35 percent by weight, 2 to 35 percent by weight, 3 to 35 percent by weight, 4 to 35 percent by weight, 5 to 35 percent by weight, 6 to 35 percent by weight, 7 to 35 percent by weight, 8 to 35 percent by weight, 9 to 35 percent by weight, or 10 to 35 percent by weight.

In certain embodiments, the active agent may be present in the activated fiber composition in an amount, based on the total weight of the activated fiber composition, of 0.01 to 30 percent by weight, 0.05 to 30 percent by weight, 0.1 to 30 percent by weight, 0.5 to 30 percent by weight, 1 to 30 percent by weight, 2 to 30 percent by weight, 3 to 30 percent by weight, 4 to 30 percent by weight, 5 to 30 percent by weight, 6 to 30 percent by weight, 7 to 30 percent by weight, 8 to 30 percent by weight, 9 to 30 percent by weight, or 10 to 30 percent by weight.

In certain embodiments, the active agent may be present in the activated fiber composition in an amount, based on the total weight of the activated fiber composition, of 0.01 to 25 percent by weight, 0.05 to 25 percent by weight, 0.1 to 25 percent by weight, 0.5 to 25 percent by weight, 1 to 25 percent by weight, 2 to 25 percent by weight, 3 to 25 percent by weight, 4 to 25 percent by weight, 5 to 25 percent by weight, 6 to 25 percent by weight, 7 to 25 percent by weight, 8 to 25 percent by weight, 9 to 25 percent by weight, or 10 to 25 percent by weight.

In certain embodiments, the active agent may be present in the activated fiber composition in an amount, based on the total weight of the activated fiber composition, of 0.01 to 20 percent by weight, 0.05 to 20 percent by weight, 0.1 to 20 percent by weight, 0.5 to 20 percent by weight, 1 to 20 percent by weight, 2 to 20 percent by weight, 3 to 20 percent by weight, 4 to 20 percent by weight, 5 to 20 percent by weight, 6 to 20 percent by weight, 7 to 20 percent by weight, 8 to 20 percent by weight, 9 to 20 percent by weight, or 10 to 20 percent by weight.

In certain embodiments, the active agent may be present in the activated fiber composition in an amount, based on the total weight of the activated fiber composition, of 0.01 to 15 percent by weight, 0.05 to 15 percent by weight, 0.1 to 15 percent by weight, 0.5 to 15 percent by weight, 1 to 15 percent by weight, 2 to 15 percent by weight, 3 to 15 percent by weight, 4 to 15 percent by weight, 5 to 15 percent by weight, 6 to 15 percent by weight, 7 to 15 percent by weight, 8 to 15 percent by weight, 9 to 15 percent by weight, or 10 to 15 percent by weight.

In certain embodiments, the active agent may be present in the activated fiber composition in an amount, based on the total weight of the activated fiber composition, of 0.01 to 10 percent by weight, 0.05 to 10 percent by weight, 0.1 to 10 percent by weight, 0.5 to 10 percent by weight, 1 to 10 percent by weight, 2 to 10 percent by weight, 3 to 10 percent by weight, 4 to 10 percent by weight, 5 to 10 percent by weight, 6 to 10 percent by weight, 7 to 10 percent by weight, 8 to 10 percent by weight, or 9 to 10 percent by weight.

In embodiments in which the active agent is incorporated into the inorganic fibers, the active agent may be present in an amount, based on the total weight of the activated fiber composition, of greater than 0 to 10 percent by weight, 0.0001 to 10 percent by weight, 0.0002 to 10 percent by weight, 0.0003 to 10 percent by weight, 0.0004 to 10 percent by weight, 0.0005 to 10 percent by weight, 0.0006 to 10 percent by weight, 0.0007 to 10 percent by weight, 0.0008 to 10 percent by weight, 0.0009 to 10 percent by weight, 0.001 to 10 percent by weight, 0.002 to 10 percent by weight, 0.003 to 10 percent by weight, 0.004 to 10 percent by weight, 0.005 to 10 percent by weight, 0.006 to 10 percent by weight, 0.007 to 10 percent by weight, 0.008 to 10 percent by weight, 0.009 to 10 percent by weight, 0.01 to 10 percent by weight, 0.02 to 10 percent by weight, 0.03 to 10 percent by weight, 0.04 to 10 percent by weight, 0.05 to 10 percent by weight, 0.06 to 10 percent by weight, 0.07 to 10 percent by weight, 0.08 to 10 percent by weight, 0.09 to 10 percent by weight, 0.1 to 10 percent by weight, 0.2 to 10 percent by weight, 0.3 to 10 percent by weight, 0.4 to 10 percent by weight, 0.5 to 10 percent by weight, 0.6 to 10 percent by weight, 0.7 to 10 percent by weight, 0.8 to 10 percent by weight, 0.9 to 10 percent by weight, or 1 to 10 percent by weight.

In embodiments in which the active agent is incorporated into the inorganic fibers, the active agent may be present in an amount, based on the total weight of the activated fiber composition, of greater than 0 to 8 percent by weight, 0.0001 to 8 percent by weight, 0.0002 to 8 percent by weight, 0.0003 to 8 percent by weight, 0.0004 to 8 percent by weight, 0.0005 to 8 percent by weight, 0.0006 to 8 percent by weight, 0.0007 to 8 percent by weight, 0.0008 to 8 percent by weight, 0.0009 to 8 percent by weight, 0.001 to 8 percent by weight, 0.002 to 8 percent by weight, 0.003 to 8 percent by weight, 0.004 to 8 percent by weight, 0.005 to 8 percent by weight, 0.006 to 8 percent by weight, 0.007 to 8 percent by weight, 0.008 to 8 percent by weight, 0.009 to 8 percent by weight, 0.01 to 8 percent by weight, 0.02 to 8 percent by weight, 0.03 to 8 percent by weight, 0.04 to 8 percent by weight, 0.05 to 8 percent by weight, 0.06 to 8 percent by weight, 0.07 to 8 percent by weight, 0.08 to 8 percent by weight, 0.09 to 8 percent by weight, 0.1 to 8 percent by weight, 0.2 to 8 percent by weight, 0.3 to 8 percent by weight, 0.4 to 8 percent by weight, 0.5 to 8 percent by weight, 0.6 to 8 percent by weight, 0.7 to 8 percent by weight, 0.8 to 8 percent by weight, 0.9 to 8 percent by weight, or 1 to 8 percent by weight.

In embodiments in which the active agent is incorporated into the inorganic fibers, the active agent may be present in an amount, based on the total weight of the activated fiber composition, of greater than 0 to 6 percent by weight, 0.0001 to 6 percent by weight, 0.0002 to 6 percent by weight, 0.0003 to 6 percent by weight, 0.0004 to 6 percent by weight, 0.0005 to 6 percent by weight, 0.0006 to 6 percent by weight, 0.0007 to 6 percent by weight, 0.0008 to 6 percent by weight, 0.0009 to 6 percent by weight, 0.001 to 6 percent by weight, 0.002 to 6 percent by weight, 0.003 to 6 percent by weight, 0.004 to 6 percent by weight, 0.005 to 6 percent by weight, 0.006 to 6 percent by weight, 0.007 to 6 percent by weight, 0.008 to 6 percent by weight, 0.009 to 6 percent by weight, 0.01 to 6 percent by weight, 0.02 to 6 percent by weight, 0.03 to 6 percent by weight, 0.04 to 6 percent by weight, 0.05 to 6 percent by weight, 0.06 to 6 percent by weight, 0.07 to 6 percent by weight, 0.08 to 6 percent by weight, 0.09 to 6 percent by weight, 0.1 to 6 percent by weight, 0.2 to 6 percent by weight, 0.3 to 6 percent by weight, 0.4 to 6 percent by weight, 0.5 to 6 percent by weight, 0.6 to 6 percent by weight, 0.7 to 6 percent by weight, 0.8 to 6 percent by weight, 0.9 to 6 percent by weight, or 1 to 6 percent by weight.

In embodiments in which the active agent is incorporated into the inorganic fibers, the active agent may be present in an amount, based on the total weight of the activated fiber composition, of greater than 0 to 4 percent by weight, 0.0001 to 4 percent by weight, 0.0002 to 4 percent by weight, 0.0003 to 4 percent by weight, 0.0004 to 4 percent by weight, 0.0005 to 4 percent by weight, 0.0006 to 4 percent by weight, 0.0007 to 4 percent by weight, 0.0008 to 4 percent by weight, 0.0009 to 4 percent by weight, 0.001 to 4 percent by weight, 0.002 to 4 percent by weight, 0.003 to 4 percent by weight, 0.004 to 4 percent by weight, 0.005 to 4 percent by weight, 0.006 to 4 percent by weight, 0.007 to 4 percent by weight, 0.008 to 4 percent by weight, 0.009 to 4 percent by weight, 0.01 to 4 percent by weight, 0.02 to 4 percent by weight, 0.03 to 4 percent by weight, 0.04 to 4 percent by weight, 0.05 to 4 percent by weight, 0.06 to 4 percent by weight, 0.07 to 4 percent by weight, 0.08 to 4 percent by weight, 0.09 to 4 percent by weight, 0.1 to 4 percent by weight, 0.2 to 4 percent by weight, 0.3 to 4 percent by weight, 0.4 to 4 percent by weight, 0.5 to 4 percent by weight, 0.6 to 4 percent by weight, 0.7 to 4 percent by weight, 0.8 to 4 percent by weight, 0.9 to 4 percent by weight, 1 to 4 percent by weight, or 3 to 4 percent by weight.

In embodiments in which the active agent is incorporated into the inorganic fibers, the active agent may be present in an amount, based on the total weight of the activated fiber composition, of greater than 0 to 2 percent by weight, 0.0001 to 2 percent by weight, 0.0002 to 2 percent by weight, 0.0003 to 2 percent by weight, 0.0004 to 2 percent by weight, 0.0005 to 2 percent by weight, 0.0006 to 2 percent by weight, 0.0007 to 2 percent by weight, 0.0008 to 2 percent by weight, 0.0009 to 2 percent by weight, 0.001 to 2 percent by weight, 0.002 to 2 percent by weight, 0.003 to 2 percent by weight, 0.004 to 2 percent by weight, 0.005 to 2 percent by weight, 0.006 to 2 percent by weight, 0.007 to 2 percent by weight, 0.008 to 2 percent by weight, 0.009 to 2 percent by weight, 0.01 to 2 percent by weight, 0.02 to 2 percent by weight, 0.03 to 2 percent by weight, 0.04 to 2 percent by weight, 0.05 to 2 percent by weight, 0.06 to 2 percent by weight, 0.07 to 2 percent by weight, 0.08 to 2 percent by weight, 0.09 to 2 percent by weight, 0.1 to 2 percent by weight, 0.2 to 2 percent by weight, 0.3 to 2 percent by weight, 0.4 to 2 percent by weight, 0.5 to 2 percent by weight, 0.6 to 2 percent by weight, 0.7 to 2 percent by weight, 0.8 to 2 percent by weight, 0.9 to 2 percent by weight, or 1 to 2 percent by weight.

In embodiments in which the active agent is incorporated into the inorganic fibers, the active agent may be present in an amount, based on the total weight of the activated fiber composition, of greater than 0 to 1 percent by weight, 0.0001 to 1 percent by weight, 0.0002 to 1 percent by weight, 0.0003 to 1 percent by weight, 0.0004 to 1 percent by weight, 0.0005 to 1 percent by weight, 0.0006 to 1 percent by weight, 0.0007 to 1 percent by weight, 0.0008 to 1 percent by weight, 0.0009 to 1 percent by weight, 0.001 to 1 percent by weight, 0.002 to 1 percent by weight, 0.003 to 1 percent by weight, 0.004 to 1 percent by weight, 0.005 to 1 percent by weight, 0.006 to 1 percent by weight, 0.007 to 1 percent by weight, 0.008 to 1 percent by weight, 0.009 to 1 percent by weight, 0.01 to 1 percent by weight, 0.02 to 1 percent by weight, 0.03 to 1 percent by weight, 0.04 to 1 percent by weight, 0.05 to 1 percent by weight, 0.06 to 1 percent by weight, 0.07 to 1 percent by weight, 0.08 to 1 percent by weight, 0.09 to 1 percent by weight, 0.1 to 1 percent by weight, 0.2 to 1 percent by weight, 0.3 to 1 percent by weight, 0.4 to 1 percent by weight, 0.5 to 1 percent by weight, 0.6 to 1 percent by weight, 0.7 to 1 percent by weight, 0.8 to 1 percent by weight, or 0.9 to 1 percent by weight.

Other Components of the Activated Fiber Composition

In certain embodiments, the activated fiber composition of any of the above embodiments may further include a blend of different inorganic fiber compositions. In certain embodiments, the activated fiber composition of any of the above embodiments may further include secondary inorganic fibers. It is noted that the "secondary inorganic fibers" are different from the "second inorganic fibers" described above. The secondary inorganic fibers may differ from the inorganic fibers described above in any one or more of the features of the inorganic fibers described above. Specifically, in the various embodiments described above, the inorganic fibers may be characterized in any number of ways. It is to be understood that, if the secondary inorganic fibers are included in any of the embodiments described above, they may differ from the inorganic fibers in that they have one or more features which are mutually exclusive from the features of the inorganic fibers in the particular embodiment in which the secondary inorganic fibers may be included. For example, the secondary inorganic fibers may have at least one of the following: (i) a surface area of less than 4 $m^2/g$; (ii) a porosity of less than 4% by volume; or (iii) a pore volume of less than 0.004 mL/g.

In certain embodiments, the secondary inorganic fibers may be present in the activated fiber composition in an amount, based on the total weight of the activated fiber composition, of up to 80 percent by weight, 1 to 80 percent by weight, 5 to 80 percent by weight, 10 to 80 percent by weight, 15 to 80 percent by weight, 20 to 80 percent by weight, 25 to 80 percent by weight, 30 to 80 percent by weight, 35 to 80 percent by weight, 40 to 80 percent by weight, 45 to 80 percent by weight, or 50 to 80 percent by weight.

In certain embodiments, the secondary inorganic fibers may be present in the activated fiber composition in an amount, based on the total weight of the activated fiber composition, of up to 70 percent by weight, 1 to 70 percent by weight, 5 to 70 percent by weight, 10 to 70 percent by weight, 15 to 70 percent by weight, 20 to 70 percent by weight, 25 to 70 percent by weight, 30 to 70 percent by weight, 35 to 70 percent by weight, 40 to 70 percent by weight, 45 to 70 percent by weight, or 50 to 70 percent by weight.

In certain embodiments, the secondary inorganic fibers may be present in the activated fiber composition in an amount, based on the total weight of the activated fiber composition, of up to 60 percent by weight, 1 to 60 percent by weight, 5 to 60 percent by weight, 10 to 60 percent by weight, 15 to 60 percent by weight, 20 to 60 percent by weight, 25 to 60 percent by weight, 30 to 60 percent by weight, 35 to 60 percent by weight, 40 to 60 percent by weight, 45 to 60 percent by weight, or 50 to 60 percent by weight.

In certain embodiments, the secondary inorganic fibers may be present in the activated fiber composition in an amount, based on the total weight of the activated fiber composition, of up to 50 percent by weight, 1 to 50 percent by weight, 5 to 50 percent by weight, 10 to 50 percent by weight, 15 to 50 percent by weight, 20 to 50 percent by weight, 25 to 50 percent by weight, 30 to 50 percent by weight, 35 to 50 percent by weight, 40 to 50 percent by weight, or 45 to 50 percent by weight.

In certain embodiments, the secondary inorganic fibers may be present in the activated fiber composition in an amount, based on the total weight of the activated fiber composition, of up to 40 percent by weight, 1 to 40 percent by weight, 5 to 40 percent by weight, 10 to 40 percent by weight, 15 to 40 percent by weight, 20 to 40 percent by weight, 25 to 40 percent by weight, 30 to 40 percent by weight, or 35 to 40 percent by weight.

In certain embodiments, the secondary inorganic fibers may be present in the activated fiber composition in an amount, based on the total weight of the activated fiber composition, of up to 30 percent by weight, 1 to 30 percent by weight, 5 to 30 percent by weight, 10 to 30 percent by weight, 15 to 30 percent by weight, 20 to 30 percent by weight, or 25 to 30 percent by weight.

In certain embodiments, the activated fiber composition of any of the above embodiments may further include organic fibers, metal fibers, carbon fibers, or combinations thereof.

In certain embodiments, the activated fiber composition of any of the above embodiments may further include a binder. The binder may include an organic binder and/or an inorganic binder. The organic binder may include polymer emulsions, solvent-based polymers, solvent-free polymers, starches, organic binder fibers, or mixtures thereof. The polymer emulsions may include latex, natural rubber latex, styrene-butadiene latex, butadiene-acrylonitrile latex, latexes of acrylate/methacrylate polymers/copolymers, or mixtures thereof. The solvent-based polymers may include acrylics, polyurethanes, vinyl acetate, celluloses, rubber-based organic polymers, or mixtures thereof. The solvent-free polymers may include natural rubber, styrene-butadiene rubber, elastomers, or combinations thereof. The starches may include potato starch, corn starch, or mixtures thereof. The organic binder fibers may include polyvinyl alcohol ("PVA") fibers, microfibrillated cellulose fibers, or combinations thereof.

The inorganic binder may include a colloidal inorganic oxide dispersion including at silica, alumina, titania, zinc, magnesia, zirconia, or mixtures thereof.

In certain embodiments, the binder may be present in the activated fiber composition in an amount, based on the total weight of the activated fiber composition, of up to 50 percent by weight, e.g., 0.1 to 50 percent by weight, 0.5 to 50 percent by weight, 1 to 50 percent by weight, 2 to 50 percent by weight, 3 to 50 percent by weight, 4 to 50 percent by weight, 5 to 50 percent by weight, 6 to 50 percent by weight, 7 to 50 percent by weight, 8 to 50 percent by weight, 9 to 50 percent by weight, or 10 to 50 percent by weight.

In certain embodiments, the binder may be present in the activated fiber composition in an amount, based on the total weight of the activated fiber composition, of up to 45 percent by weight, e.g., 0.1 to 45 percent by weight, 0.5 to 45 percent by weight, 1 to 45 percent by weight, 2 to 45 percent by weight, 3 to 45 percent by weight, 4 to 45 percent by weight, 5 to 45 percent by weight, 6 to 45 percent by weight, 7 to 45 percent by weight, 8 to 45 percent by weight, 9 to 45 percent by weight, or 10 to 45 percent by weight.

In certain embodiments, the binder may be present in the activated fiber composition in an amount, based on the total weight of the activated fiber composition, of up to 40 percent by weight, e.g., 0.1 to 40 percent by weight, 0.5 to 40 percent by weight, 1 to 40 percent by weight, 2 to 40 percent by weight, 3 to 40 percent by weight, 4 to 40 percent by weight, 5 to 40 percent by weight, 6 to 40 percent by weight, 7 to 40 percent by weight, 8 to 40 percent by weight, 9 to 40 percent by weight, or 10 to 40 percent by weight.

In certain embodiments, the binder may be present in the activated fiber composition in an amount, based on the total weight of the activated fiber composition, of up to 35 percent by weight, e.g., 0.1 to 35 percent by weight, 0.5 to 35 percent by weight, 1 to 35 percent by weight, 2 to 35 percent by weight, 3 to 35 percent by weight, 4 to 35 percent by weight, 5 to 35 percent by weight, 6 to 35 percent by weight, 7 to 35 percent by weight, 8 to 35 percent by weight, 9 to 35 percent by weight, or 10 to 35 percent by weight.

In certain embodiments, the binder may be present in the activated fiber composition in an amount, based on the total weight of the activated fiber composition, of up to 30 percent by weight, e.g., 0.1 to 30 percent by weight, 0.5 to 30 percent by weight, 1 to 30 percent by weight, 2 to 30 percent by weight, 3 to 30 percent by weight, 4 to 30 percent by weight, 5 to 30 percent by weight, 6 to 30 percent by weight, 7 to 30 percent by weight, 8 to 30 percent by weight, 9 to 30 percent by weight, or 10 to 30 percent by weight.

In certain embodiments, the activated fiber composition of any of the above embodiments may further include an intumescent material. The intumescent material may expand upon first use of the composition, in order to provide mechanical support within a product form made from the composition. Intumescent materials may also provide other benefits which may be known in the art. The intumescent material may include mica, unexpanded vermiculite, ion-exchanged vermiculite, heat treated vermiculite, hydrobiotite, alkaline metal silicates, talc, clay, expandable graphite, or mixtures thereof.

In certain embodiments, the intumescent material may be present in the activated fiber composition in an amount, based on the total weight of the activated fiber composition, of up to 50 percent by weight, e.g., 1 to 50 percent by weight, 2 to 50 percent by weight, 3 to 50 percent by weight, 4 to 50 percent by weight, 5 to 50 percent by weight, 10 to 50 percent by weight, 15 to 50 percent by weight, 20 to 50 percent by weight, 25 to 50 percent by weight, 30 to 50 percent by weight, 35 to 50 percent by weight, 40 to 50 percent by weight, or 45 to 50 percent by weight.

In certain embodiments, the intumescent material may be present in the activated fiber composition in an amount, based on the total weight of the activated fiber composition, of up to 45 percent by weight, e.g., 1 to 45 percent by weight, 2 to 45 percent by weight, 3 to 45 percent by weight, 4 to 45 percent by weight, 5 to 45 percent by weight, 10 to 45 percent by weight, 15 to 45 percent by weight, 20 to 45 percent by weight, 25 to 45 percent by weight, 30 to 45 percent by weight, 35 to 45 percent by weight, or 40 to 45 percent by weight.

In certain embodiments, the intumescent material may be present in the activated fiber composition in an amount, based on the total weight of the activated fiber composition, of up to 40 percent by weight, e.g., 1 to 40 percent by weight, 2 to 40 percent by weight, 3 to 40 percent by weight, 4 to 40 percent by weight, 5 to 40 percent by weight, 10 to 40 percent by weight, 15 to 40 percent by weight, 20 to 40 percent by weight, 25 to 40 percent by weight, 30 to 40 percent by weight, or 35 to 40 percent by weight.

In certain embodiments, the intumescent material may be present in the activated fiber composition in an amount, based on the total weight of the activated fiber composition, of up to 35 percent by weight, e.g., 1 to 35 percent by weight, 2 to 35 percent by weight, 3 to 35 percent by weight, 4 to 35 percent by weight, 5 to 35 percent by weight, 10 to 35 percent by weight, 15 to 35 percent by weight, 20 to 35 percent by weight, 25 to 35 percent by weight, or 30 to 35 percent by weight.

In certain embodiments, the intumescent material may be present in the activated fiber composition in an amount, based on the total weight of the activated fiber composition, of up to 30 percent by weight, e.g., 1 to 30 percent by weight, 2 to 30 percent by weight, 3 to 30 percent by weight, 4 to 30 percent by weight, 5 to 30 percent by weight, 10 to 30 percent by weight, 15 to 30 percent by weight, 20 to 30 percent by weight, or 25 to 30 percent by weight.

In certain embodiments, the intumescent material may be present in the activated fiber composition in an amount, based on the total weight of the activated fiber composition, of up to 25 percent by weight, e.g., 1 to 25 percent by weight, 2 to 25 percent by weight, 3 to 25 percent by weight, 4 to 25 percent by weight, 5 to 25 percent by weight, 10 to 25 percent by weight, 15 to 25 percent by weight, or 20 to 25 percent by weight.

In certain embodiments, the intumescent material may be present in the activated fiber composition in an amount, based on the total weight of the activated fiber composition, of up to 20 percent by weight, e.g., 1 to 20 percent by weight, 2 to 20 percent by weight, 3 to 20 percent by weight, 4 to 20 percent by weight, 5 to 20 percent by weight, 10 to 20 percent by weight, or 15 to 20 percent by weight.

In certain embodiments, the intumescent material may be present in the activated fiber composition in an amount, based on the total weight of the activated fiber composition, of up to 15 percent by weight, e.g., 1 to 15 percent by weight, 2 to 15 percent by weight, 3 to 15 percent by weight, 4 to 15 percent by weight, 5 to 15 percent by weight, or 10 to 15 percent by weight.

In any embodiment, the activated fiber composition may further comprise a secondary agent incorporated into the inorganic fibers and/or applied onto at least a portion of the inorganic fibers. For example, the secondary agent could include elements that selectively capture and release gases depending on environmental conditions, e.g., temperature or composition). Nonlimiting examples of secondary agents include barium carbonate, barium oxide, barium hydroxide, and ceramic supported barium compounds including gamma-alumina. These compounds selectively capture nitrous oxides (NOx) that are released when the gas stream temperature is high enough. In embodiments where the active agent is a catalyst, the releasing temperature may be greater than the light-off temperature of the catalyst. As used herein, the "light-off temperature" is the temperature at which an exhaust gas treatment device is capable of processing a stream of exhaust gas, such that upon exiting the exhaust gas treatment device, the stream of exhaust gas complies with local regulations and/or industry conventions. In any embodiment, the NOx capturing materials may be positioned within an emission control device including the activated fiber composition ahead of the active agent such that the waste gas would interact with the NOx capturing material prior to interacting with the active agent. In other embodiments, the NOx capturing material may be located in proximity to the active agent. In such embodiments, waste gases reach the NOx capturing material and the active agent at approximately the same time.

Other nonlimiting examples of secondary agents include cerium, lanthanum, barium, and other metals capable of storing oxygen. When included in an emission control device (e.g., those used in the automotive industry), the oxygen storing material can provide a source of oxygen when converting CO to $CO_2$ during low-oxygen operations (e.g., during fuel rich operations). These oxygen storing materials readily form oxides in oxygen rich conditions (e.g., lean operation of an engine) that is released when the concentration of oxygen in the air mix drops during low-oxygen operation. In an emission control device including the activated fiber composition, the oxygen storing material may be positioned, e.g., in proximity to the active agent.

In any embodiment, whether incorporated into or applied onto the inorganic fibers, the secondary agent may constitute 0 to 20 percent by weight, based on the total weight of the activated fiber composition. In some embodiments, the secondary agent is present in an amount, based on the total weight of the activated fiber composition, of 0.001 to 15 percent by weight, 0.01 to 10 percent by weight, 0.10 to 9 percent by weight, 0.25 to 8 percent by weight, 0.5 to 7 percent by weight, 0.75 to 6 percent by weight, 1 to 5 percent by weight, 1.5 to 4 percent by weight, 1.75 to 3 percent by weight, 1 to 2 percent by weight, 0.5 to 1.5 percent by weight, 0.1 to 1 percent by weight, 0.25 to 0.75 percent by weight, 0.01 to 0.5 percent by weight, or 0.1 to 0.5 percent by weight.

Fiber Aggregates

Also provided are fiber aggregates including the activated fiber composition of any of the embodiments described above. In certain embodiments, the fiber aggregate may be densified, such as by needling and/or stitching. The fiber aggregates may include the following product forms: mats, blankets, boards, papers, felts, net-shape products (such as those formed by vacuum forming a slurry of fibers), or textiles.

FIGS. 1A through 1H illustrate various geometries of fiber aggregates which may be formed from the compositions described herein. The fiber aggregates may be formed via any known methods, such as air-laying, wet-laying (such as a paper-making type process) or vacuum-forming.

Composite Materials

Also provided are composite materials including the activated fiber composition of any of the embodiments described above, and a support matrix at least partially supporting the activated fiber composition. The support matrix may include known materials used in product forms similar to those described herein.

For example, inorganic oxide catalyst support materials may be made by compacting loose powders of zeolite, alumina, zirconia, silica or titania, and may include a minor amount of a compatible inorganic binder. Porosity and catalyst carrying capacity of these support materials are controlled, at least in part, by the porosity of the loose powders and the spaces between the loose powders in the compacted structure. The compositions described hereinabove may be incorporated into these support materials to improve the physical properties, such as the mechanical strength, of the support materials, while also supporting or improving the catalytic carrying capability of the support materials.

In certain embodiments, a composite material may include an inorganic oxide support matrix and the activated fiber composition of any of the embodiments described above. In certain embodiments, the inorganic oxide support matrix and the activated fiber composition of any of the embodiments described above may be selected from similar or different chemical compositions of the various ingredients. For example, it may be desirable to select an inorganic oxide support matrix having a similar chemical composition as the inorganic fibers present in the activated fiber composition of any of the embodiments described above, in order to have similar thermal expansion of the materials to reduce the opportunity for damage to the composite material during repeated thermal expansion and contraction cycles. The composite material may also include binders and/or other additives to improve the physical/chemical properties of the composite materials.

In certain embodiments, the composite material may include, based on the total weight of the composite material, up to 99.9 percent by weight of the inorganic oxide support matrix and greater than 0.1 percent by weight of the activated fiber composition of any of the embodiments described above, up to 99.5 percent by weight of the inorganic oxide support matrix and greater than 0.5 percent by weight of the activated fiber composition of any of the embodiments described above, up to 99 percent by weight of the inorganic oxide support matrix and greater than 1 percent by weight of the activated fiber composition of any of the embodiments described above, up to 98 percent by weight of the inorganic oxide support matrix and greater than 2 percent by weight of the activated fiber composition of any of the embodiments described above, up to 97 percent by weight of the inorganic oxide support matrix and greater than 3 percent by weight of the activated fiber composition of any of the embodiments described above, up to 96 percent by weight of the inorganic oxide support matrix and greater than 4 percent by weight of the activated fiber composition of any of the embodiments described above, up to 95 percent by weight of the inorganic oxide support matrix and greater than 5 percent by weight of the activated fiber composition of any of the embodiments described above, up to 90 percent by weight of the inorganic oxide support matrix and greater than 10 percent by weight of the activated fiber composition of any of the embodiments described above, up to 85 percent by weight of the inorganic oxide support matrix and greater than 15 percent by weight of the activated fiber composition of any of the embodiments described above, up to 80 percent by weight of the inorganic oxide support matrix and greater than 20 percent by weight of the activated fiber composition of any of the embodiments described above, up to 70 percent by weight of the inorganic oxide support matrix and greater than 30 percent by weight of the activated fiber composition of any of the embodiments described above, up to 60 percent by weight of the inorganic oxide support matrix and greater than 40 percent by weight of the activated fiber composition of any of the embodiments described above, up to 50 percent by weight of the inorganic oxide support matrix and greater than 50 percent by weight of the activated fiber composition of any of the embodiments described above, up to 40 percent by weight of the inorganic oxide support matrix and greater than 60 percent by weight of the activated fiber composition of any of the embodiments described above, up to 30 percent by weight of the inorganic oxide support matrix and greater than 70 percent by weight of the activated fiber composition of any of the embodiments described above, up to 20 percent by weight of the inorganic oxide support matrix and greater than 80 percent by weight of the activated fiber composition of any of the embodiments described above, up to 15 percent by weight of the inorganic oxide support matrix and greater than 85 percent by weight of the activated fiber composition of any of the embodiments described above, up to 10 percent by weight of the inorganic oxide support matrix and greater than 90 percent by weight of the activated fiber composition of any of the embodiments described above, up to 5 percent by weight of the inorganic oxide support matrix and greater than 95 percent by weight of the activated fiber composition of any of the embodiments described above, up to 4 percent by weight of the inorganic oxide support matrix and greater than 96 percent by weight of the activated fiber composition of any of the embodiments described above, up to 3 percent by weight of the inorganic oxide support matrix and greater than 97 percent by weight of the activated fiber composition of any of the embodiments described above, up to 2 percent by weight of the inorganic oxide support matrix and greater than 98 percent by weight of the activated fiber composition of any of the embodiments described above, up to 1 percent by weight of the inorganic oxide support matrix and greater than 99 percent by weight of the activated fiber composition of any of the embodiments described above, up to 0.5 percent by weight of the inorganic oxide support matrix and greater than 99.5 percent by weight of the activated fiber composition of any of the embodiments described above, or up to 0.1 percent by weight of the inorganic oxide support matrix and greater than 99.9 percent by weight of the activated fiber composition of any of the embodiments described above.

Filter Elements

Also provided are filter elements including the activated fiber composition of any of the embodiments described above. In certain embodiments, the filter elements may function to remove and/or alter undesirable materials from an exhaust gas stream. In certain embodiments, the filter elements may function primarily to remove undesirable particulate material from an exhaust gas stream but may also function to adsorb undesirable gases and/or chemically alter undesirable gases in an exhaust stream. As discussed above, the filter elements disclosed herein may replace conventional filter elements, such as ceramic honeycomb filter elements. The filter elements disclosed herein, including the activated fiber composition of any of the embodiments described above, may have one or more of the following benefits as compared to conventional filter elements: reduced cost; reduced size; reduced weight; lower back pressure generation; increased filtration performance; fewer temperature restraints; fewer location restraints; and increased catalytic efficiency.

For example, exhaust gas treatment devices, such as catalytic converters, diesel particulate filters, or catalyzed diesel particulate filters, are typically included in the exhaust systems of automotive vehicles to reduce the amount of pollutants discharged to the environment. While exhaust gas treatment devices used today perform satisfactorily once their light-off temperature is reached, a pollution problem exists during the light-off period. For example, it has been determined that the majority of the pollutants exhausted to the environment from an automotive exhaust system which includes an exhaust gas treatment device are exhausted during the light-off period.

As used herein, the light-off temperature is the temperature at which an exhaust gas treatment device is capable of processing a stream of exhaust gas, such that upon exiting the exhaust gas treatment device, the stream of exhaust gas complies with local regulations and/or industry conventions. The light-off period is the time required for the exhaust gas treatment device to reach its light-off temperature.

If a filter element is able to be placed closer to the source of exhaust gas because it is capable of tolerating high temperatures, the filter element will be heated by the exhaust gas more quickly, thereby reducing the light-off period of the filter element.

The filter elements described herein may also be tailored to provide desired back pressure generation, gas flow through the element, and/or filtration performance by altering the density of the filter element, the orientation of the inorganic fibers in the filter element, and/or the flexibility of the filter element. For instance, the back pressure generation may be adjusted within ranges observed for conventional filter elements, such as the 400 cpsi and 900 cpsi ceramic honeycomb filter shown in FIGS. 12A and 12B, respectively. Typical back pressure generation of these 400 cpsi and 900 cpsi ceramic honeycomb filters, measured in a 2-inch diameter pipe, is shown in FIG. 13.

In certain embodiments, the filter element may include an exterior support structure. The exterior support structure may include a mesh, such as a metal mesh or a ceramic mesh. In certain embodiments, the filter element may include a metallic wire provided within the filter element, which may increase heat transfer and further reduce the light-off period.

In certain embodiments, the filter element may further include binder applied to a portion of the exterior surface of the filter element. The binder may include an organic binder and/or an inorganic binder. The organic binder may include polymer emulsions, solvent-based polymers, solvent-free polymers, starches, organic binder fibers, or mixtures thereof. The polymer emulsions may include latex, natural rubber latex, styrene-butadiene latex, butadiene-acrylonitrile latex, latexes of acrylate/methacrylate polymers/copolymers, or mixtures thereof. The solvent-based polymers may include acrylics, polyurethanes, vinyl acetate, celluloses, rubber-based organic polymers, or combinations thereof. The solvent-free polymers may include natural rubber, styrene-butadiene rubber, elastomers, or combinations thereof. The starches may include potato starch, corn starch, or mixtures thereof. The organic binder fibers may include VA fibers, microfibrillated cellulose fibers, or combinations thereof.

The inorganic binder may include a colloidal inorganic oxide dispersion including of silica, alumina, titania, zinc, magnesia, zirconia, or combinations thereof.

Filter System

Also provided are filter systems including a plurality of filter elements according to any of the embodiments described above. In certain embodiments, at least two of the plurality of filter elements may be different from each other in at least one of the following ways: (a) the porosity of the inorganic fibers present in each filter element; (b) the fiber diameter of the inorganic fibers present in each filter element; (c) the fiber length of the inorganic fibers present in each filter element; (d) the fiber composition of the inorganic fibers present in each filter element; (e) the type of active agent present in each filter element; (f) the heat transfer coefficient of each filter element; or (g) the temperature resistance of each filter element.

In certain embodiments, a filter system may include a first filter element placed proximate to the source of exhaust gas and a second filter element placed downstream from the first filter element, wherein the first filter element and the second filter element perform different functions of removing and/or altering undesirable materials from an exhaust gas stream. For example, in certain embodiments, a filter system may include a first filter element placed proximate to the source of exhaust gas, including a catalytically active agent intended to reduce more complex organic gases to carbon dioxide or carbon monoxide, and a second filter element placed downstream from the first filter element, including an active agent intended to adsorb carbon dioxide and/or carbon monoxide after the reduction reactions have completed.

Catalytic Element

Also provided are catalytic elements including the activated fiber composition of any of the embodiments described above. The catalytic elements would be expected to provide at least the same benefits as the filter element described and discussed above. Because the filter elements disclosed above may also provide catalytic functionality, the filter elements and catalytic elements disclosed herein may have many overlapping uses and functions and will therefore provide similar benefits.

In certain embodiments, the catalytic element may include an exterior support structure. The exterior support structure may include a mesh, such as a metal mesh and/or a ceramic mesh. In certain embodiments, the catalytic element may further include a metallic wire provided within the catalytic element.

In certain embodiments, the catalytic element may further include a binder applied to a portion of the exterior surface of the catalytic element. The binder may include an organic binder and/or an inorganic binder. The organic binder may include polymer emulsions, solvent-based polymers, solvent-free polymers, starches, organic binder fibers, or mixtures thereof. The polymer emulsions may include latex, natural rubber latex, styrene-butadiene latex, butadiene-acrylonitrile latex, latexes of acrylate/methacrylate polymers/copolymers, or combinations thereof. The solvent-based polymers may include acrylics, polyurethanes, vinyl acetate, celluloses, rubber-based organic polymers, or combinations thereof. The solvent-free polymers may include natural rubber, styrene-butadiene rubber, elastomers, or combinations thereof. The starches may include potato starch, corn starch, or mixtures thereof. The organic binder fibers may include PVA fibers, microfibrillated cellulose fibers, or combinations thereof.

The inorganic binder may include a colloidal inorganic oxide dispersion including silica, alumina, titania, zinc, magnesia, zirconia, or mixtures thereof.

Components of Exhaust Systems and Exhaust Systems

Also provided are exhaust conduits including an interior lining including the activated fiber composition of any of the embodiments described above. In certain embodiments an exhaust conduit may include an external conduit and an interior lining including the activated fiber composition of any of the embodiments described above.

Also provided are exhaust conduits including the activated fiber composition of any of the embodiments described above, filling substantially all of the interior space of the conduit.

Figure 2:
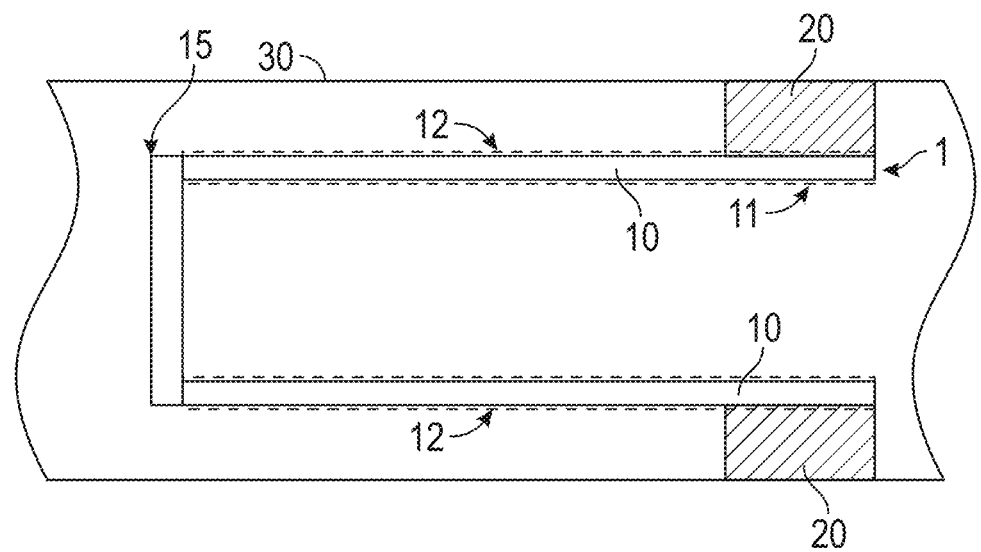
FIG. 2 is an illustrative embodiment of a product form including an activated fiber composition as described herein.

FIG. 2 illustrates an embodiment of conduits including the activated fiber composition described herein. Referring to FIG. 2, a filter element 1 is shown including an activated fiber composition 10. The activated fiber composition 10 may be encased in a first permeable support 11 facing an exhaust stream and a second permeable support 12 opposite the first. The first and second permeable supports 11, 12 allow gas to flow therethrough such that it may contact the activated fiber composition 10. In some embodiments, the first and second permeable supports 11, 12 may be made from a mesh, such as a metal mesh or a polymeric mesh. The encased activated fiber composition 10 may be secured within a conduit 30 by, e.g., a seal 20. The seal 20 may be of any suitable shape and size and in some embodiments may be, e.g., a gasket or a weld. In FIG. 2, gas to be treated flows toward the filter element 1 from right to left. Since the forward end of the filter element 1 includes a cap 15, which is less permeable than the activated fiber composition 10, the gas is forced to flow through the activated fiber composition 10. The treated gas then continues through the conduit 30 to the left.

Figure 3:
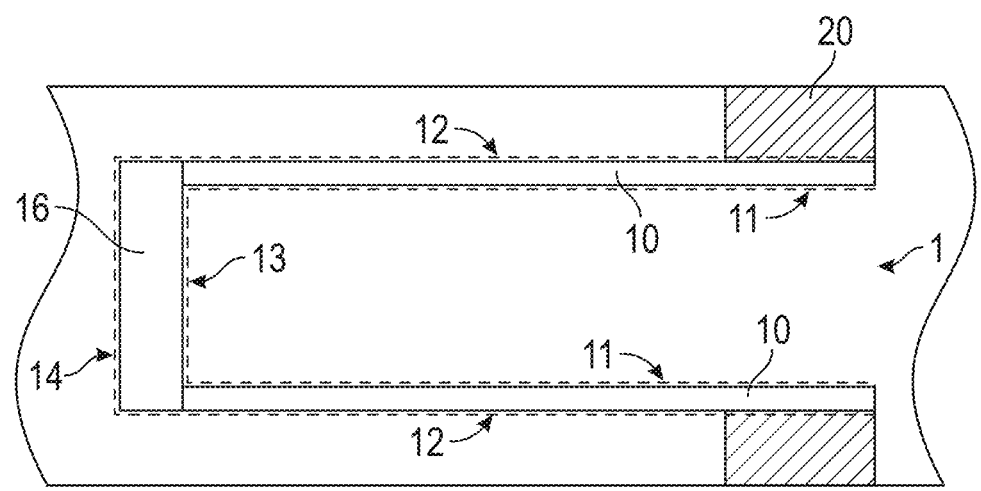
FIG. 3 is an illustrative embodiment of an exhaust system including an activated fiber composition as described herein.

Referring to FIG. 3, the downstream end of the filter element 2 may alternatively comprise a packed end 16 including a packed activated fiber composition such that the permeability of the packed end 16 is less than that of the activated fiber composition 10. The packed end 16 may include third and fourth permeable supports 13, 14 to hold the packed end 16 in place. The supports 13, 14 may be the same as or similar to supports 11, 12 and may be integrally formed therewith.

Figure 4:
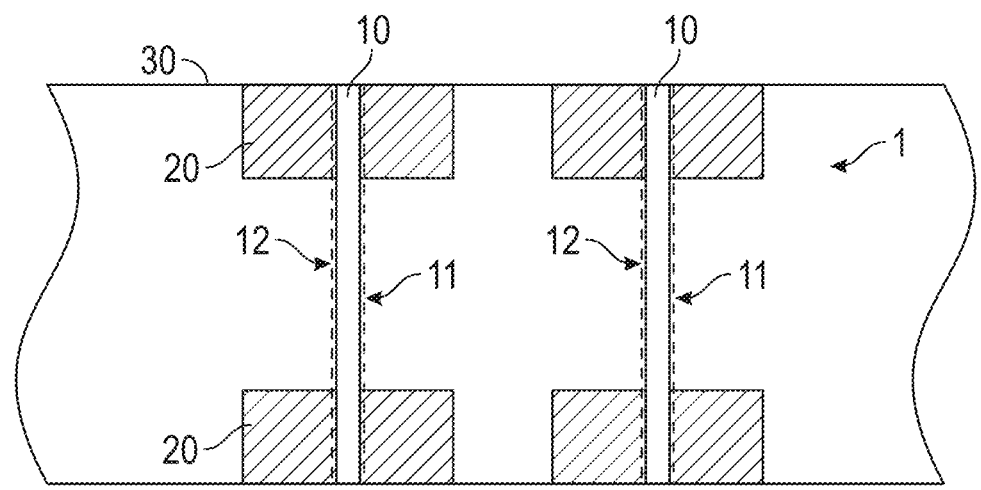
FIG. 4 is an illustrative embodiment of a product form including an activated fiber composition as described herein.
Figure 5:
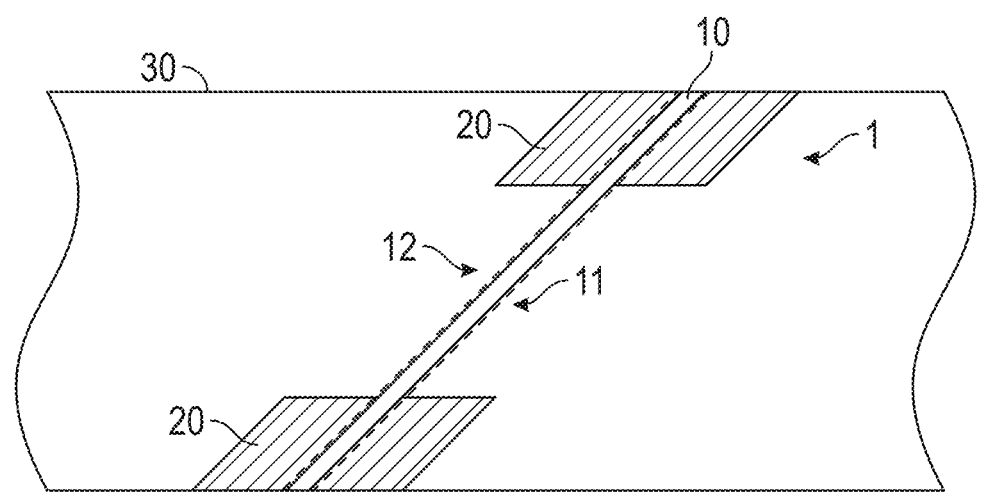
FIG. 5 is an illustrative embodiment of a product form including an activated fiber composition as described herein.

FIG. 4 depicts an alternative filter element 1 in which the incoming gas (from right to left) is forced to flow through the activated fiber composition 10 due to the activated fiber composition spanning an entire cross-section of conduit 30. Although two layers of the activated fiber composition 10 are shown, any number of layers may be employed. The first and second permeable supports 11, 12 may be the same as described above. In some embodiments, the activated fiber composition 10 may be disposed within the conduit 30 at a non-perpendicular angle, e.g., as shown in FIG. 5. In the embodiments shown in FIGS. 4 and 5, the shape of the activated fiber composition 10 may be suitably matched to a cross-sectional shape of the conduit 30. Further, in the embodiments of FIGS. 4 and 5, the seal 20 may be of any suitable form, such as, e.g., a gasket, a weld, an adhesive, or any other securing mechanism. In some embodiments, a seal is not included and the activated fiber composition 10 is fixed in place by pressure-fitting or by a screw, nail, or pin inserted into the activated fiber composition 10 from an exterior of the conduit 30.

Figure 6:
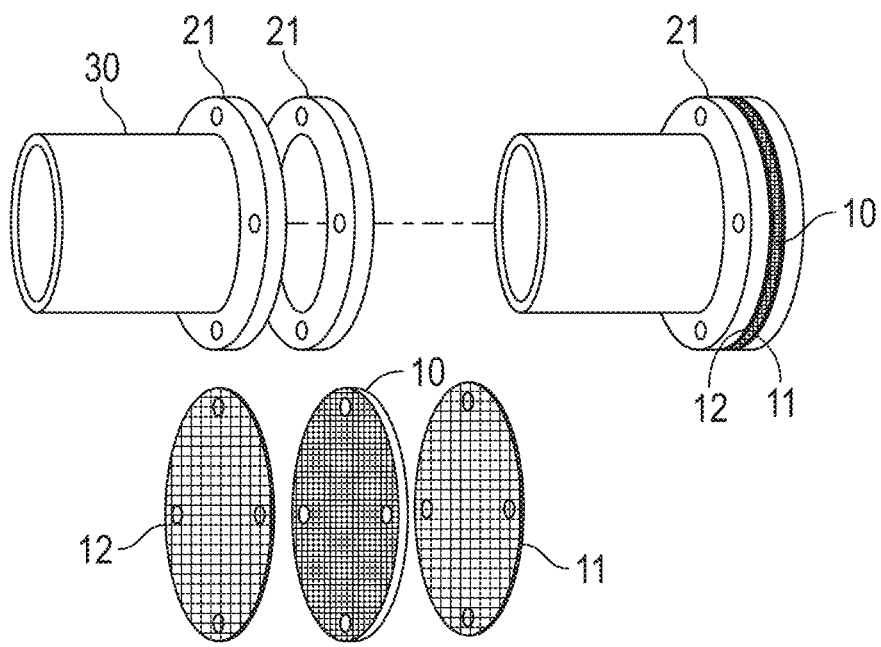
FIG. 6 is an illustrative embodiment of a product form including an activated fiber composition as described herein.

FIG. 6 depicts an alternative manner of securing the activated fiber composition 10 within the conduit 30. In FIG. 6, the activated fiber composition 10 is placed in between the first and second permeable supports 11, 12 and the encased activated fiber composition is then placed between sealing portions 21, which are connected to respective portions of the conduit 30. The sealing portions 21 may be connected to each other by any suitable means, thereby securing the encased activated fiber composition.

Figure 7:
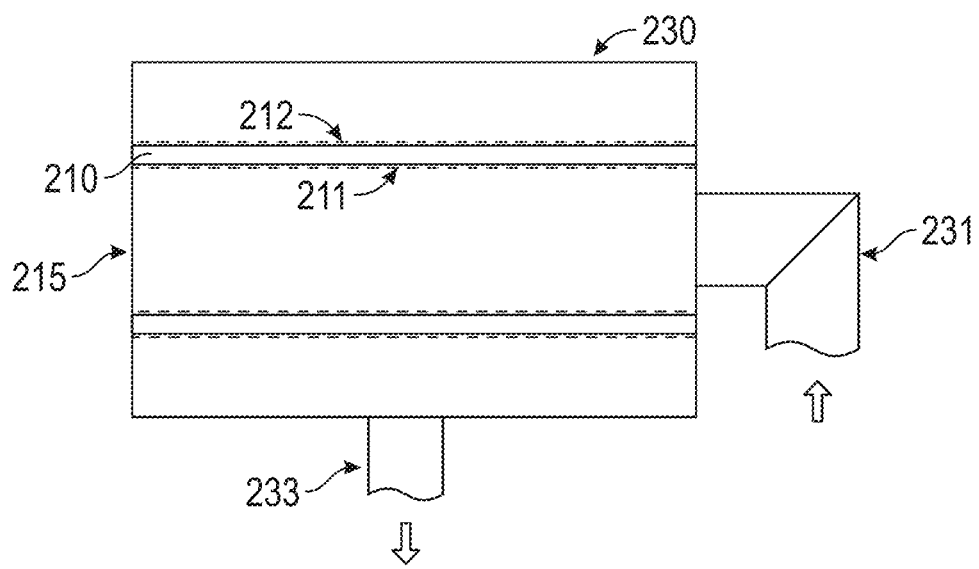
FIG. 7 is an illustrative embodiment of a product form including an activated fiber composition as described herein.

Referring to FIG. 7, the conduit may include a drum 230 connected to an inlet 231 and an outlet 233. The activated fiber composition 210 may be supported on either side thereof by a first permeable support 211 and a second permeable support 212. In FIG. 7, waste gas is forced through the activated fiber composition 210 due to the activated fiber composition 10 spanning an entire length of the drum 230 which is capped on one end by the cap 215.

Figure 8:
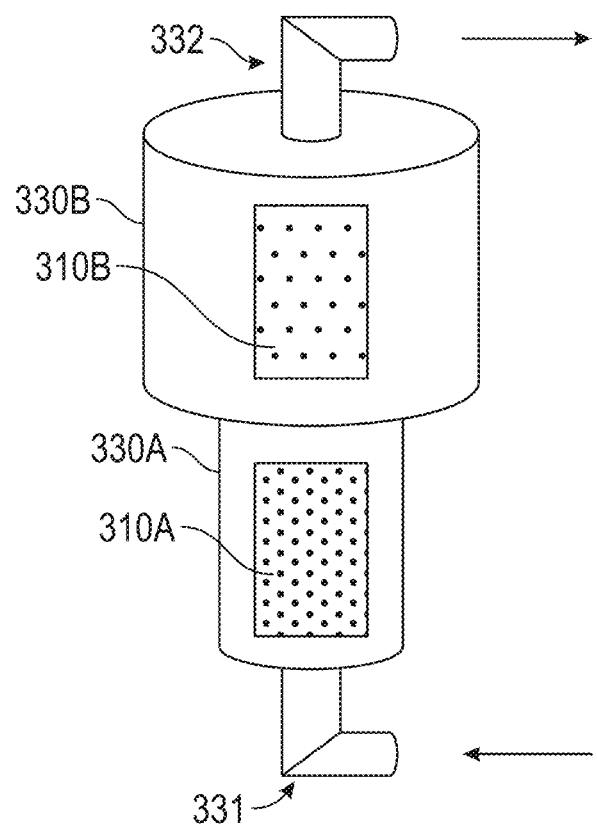
FIG. 8 is an illustrative embodiment of a product form including an activated fiber composition as described herein.

In another embodiment shown in FIG. 8, a cyclone style reactor may be employed. Specifically, in FIG. 8, waste gas may be supplied through an inlet 331 into a lower drum 330A having a smaller diameter than an upper drum 330B. In the lower drum 330A, a fluid bed of activated fibers 310A interacts with the waste gas. In the upper drum 330B, loose activated fibers 310B are sparsely present. During operation, the waste gas passes from lower drum 330A to upper drum 330B thereby being treated by the activated fibers 330A, 330B, and the treated gas flows out of the reactor through outlet 332.

Figure 9:
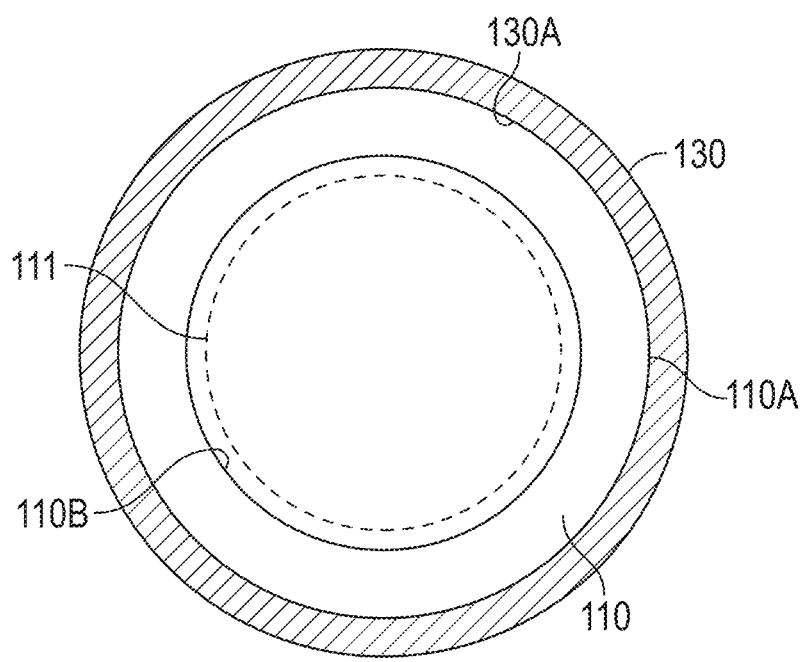
FIG. 9 is an illustrative embodiment of a product form including an activated fiber composition as described herein.

FIG. 9 depicts an embodiment in which a conduit 130 is coated with an activated fiber composition 110. In FIG. 9, an interior surface of the conduit 130A is in contact with an exterior surface of the activated fiber composition 110A. Additionally, an interior surface of the activated fiber composition 110B may include a permeable support 111 to secure the activated fiber composition 110.

Figure 10:
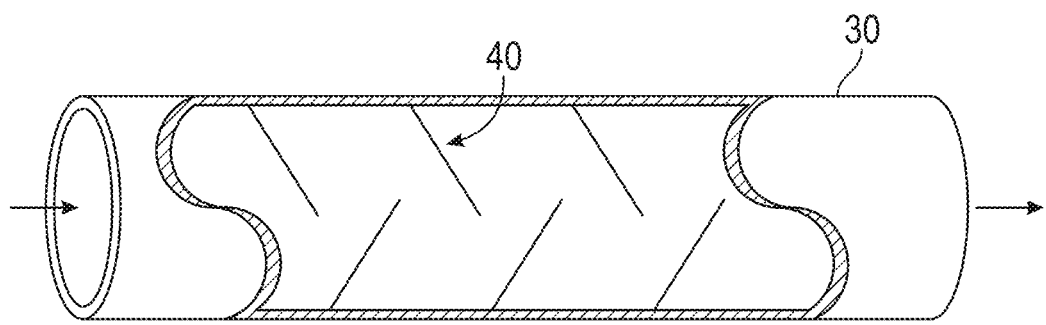
FIG. 10 is an illustrative embodiment of a product form including an activated fiber composition as described herein.
Figure 11:
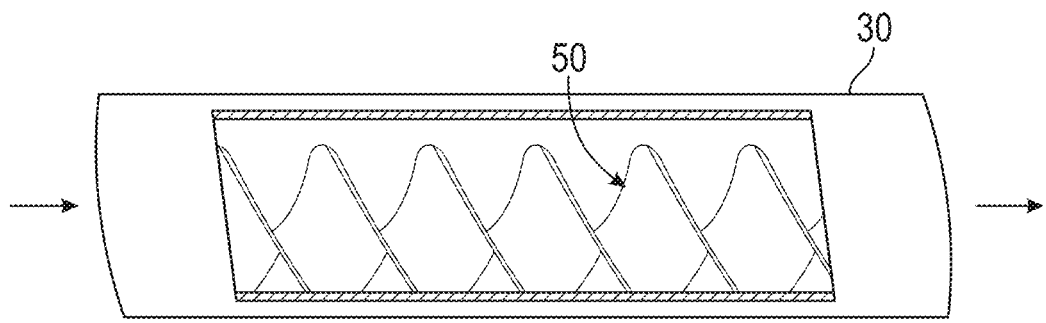
FIG. 11 is an illustrative embodiment of a product form including an activated fiber composition as described herein.

In certain embodiments, an exhaust conduit may include an interior structure which impedes the flow path of a fluid therethrough, in order to increase contact between the fluid and the structure and thereby increase activity of the active agent, wherein the interior structure includes the activated fiber composition described herein. In certain embodiments, the interior structure may include a spiral structure including the activated fiber composition of any of the embodiments described above. FIG. 10 depicts a conduit 30 having baffles 40 disposed therein. The baffles 40 may be formed of the activated fiber composition, e.g., may be formed of an activated fiber paper. FIG. 11 depicts a conduit 30 having spirally-oriented activated fiber composition 50 described herein proceeding longitudinally through a conduit.

Also provided are exhaust gas treatment devices including a filter element and/or a catalytic element according to any of the embodiments described above. For example, exhaust gas treatment devices for treating exhaust gases of automotive engines are used to affect the oxidation of carbon monoxide and hydrocarbons and the reduction of oxides of nitrogen present in the exhaust gases.

Automotive catalytic converters may include an outer metallic housing and a fragile catalyst support structure that is held within the outer metallic housing by a mounting mat. The mounting mat is positioned between the inner surface of the outer metallic housing and the outer surface of the fragile catalyst support structure. The fragile catalyst support structure is commonly referred to in the art as a "monolith". The monolith may be made from a ceramic or metallic material. The mounting mat provides thermal insulation and a holding pressure sufficient for maintaining the fragile catalyst support structure in proper position during the operation of the catalytic converter.

Diesel particulate traps may be used in automobiles that utilize diesel fuel. The diesel particulate trap generally includes an outer metallic housing and a fragile particulate filter structure that is held within the outer metallic housing by a mounting mat. The mounting mat is positioned between the inner surface of the housing and the outer surface of the particulate filter. Like the catalytic converter, the mat provides thermal insulation and a holding pressure for maintaining the particulate filter in proper position within the outer metallic housing during operation of the diesel particulate filter.

As noted hereinabove, the catalyst support structure of the catalytic converter and the diesel particulate filter are often very fragile. In fact, these structures can be so fragile that even small stresses may be sufficient to crack or crush them. In order to protect the fragile structures from thermal and mechanical shock and other stresses noted above, as well as to provide thermal insulation and a gas seal, and to hold the fragile structures in place within the housing, it is known to position at least one ply or layer of mounting or support material within the gap between the fragile structure and the housing. Thus, the mounting mats that are positioned between the outer housing and the fragile catalyst support structure or particulate filter in the automotive exhaust gas treatment device are capable of exhibiting high temperature resistance and are capable of exerting the requisite holding pressure to maintain the catalyst support structure or particulate filter in proper position during the operation of the device.

An exhaust gas treatment device is assembled by wrapping the mounting mat around at least a portion of the perimeter of the fragile catalyst support structure or diesel particulate filter and locating the wrapped structure within a housing. During the wrapping of the catalyst support structure or diesel particulate filter, the mounting mat must be bent around the fragile catalyst support structure. Tensile stresses are exerted on the mounting mat which can result in cracking or tearing of the mounting mat. As can be appreciated, the problem is exacerbated when heavy basis weight mounting mats are used to wrap the fragile structures or when the wrap is around a tight radius, such as for oval-shaped structures.

Therefore, exhaust gas treatment devices may be improved by using mounting mats made from the activated fiber composition of any of the embodiments described above, or by replacing the entire fragile structure-mounting mat assembly with a filter element/catalyst element as described herein. By replacing a conventional mounting mat with a mounting mat including an activated fiber composition of any of the embodiments described above, the mounting mat could assist in the catalytic activity of the exhaust gas treatment device. By replacing the entire fragile structure-mounting mat assembly with a filter element/catalyst element as described herein, the exhaust gas treatment device may be made more robust, may be easier to manufacture, may be capable of shorter light-off periods, and/or may increase catalytic efficiency.

Also provided are exhaust systems including one or more filter elements and/or one or more catalytic elements according to any of the embodiments described above. In certain embodiments, the exhaust system may include at least one of the following: a filter element according to any of the embodiments described above; a catalytic element according to any of the embodiments described above; an exhaust gas treatment device according to any of the embodiments described above; an exhaust conduit according to any of the embodiments described above, or any combination thereof. Any exhaust system, such as a muffler for automobiles, may include one or more product forms as described herein.

Also provided are apparatus including an internal combustion engine which produces exhaust, and an exhaust system according to any of the embodiments described above. The apparatus may further include a conduit which conveys the exhaust from the internal combustion engine to the exhaust system, the exhaust system being downstream from the internal combustion engine. The exhaust system may include at least one of the filter elements and at least one of the catalytic elements. The filter element may be downstream from the catalytic element, or the catalytic element may be downstream from the filter element. The filter element and the catalytic element may be connected via the conduit according to the embodiments described above.

It is also to be appreciated that the exhaust systems described herein may be used to process exhaust gases from any process which produces exhaust gases which may need to be processed prior to begin exhausted to an external environment. For example, many industrial processes, such as the production of energy from fossil fuels or other fuels, require complex exhaust gas treatment systems which may benefit from inclusion of the exhaust systems or individual exhaust system components described herein. The apparatus disclosed herein may replace single elements of such complex industrial exhaust systems, multiple elements of such systems, or the entire system.

Vehicles

Also provided are vehicles including the apparatus described above, and/or including the exhaust systems described above. Many jurisdictions require vehicles to comply with exhaust emissions regulations. The activated fiber compositions and product forms described herein may provide more efficient, lower cost solutions to comply with these ever more stringent regulatory requirements.

Miscellaneous Product Forms

Also provided are catalytic support materials including the activated fiber composition of any of the embodiments described above. Catalytic support materials are commonly used in production of chemicals via catalytic processes, such as steam-methane reforming to produce hydrogen. The activated fiber compositions of the embodiments described above may provide benefits when used in catalytic support materials, such as higher temperature stability, increased available active volume, lower product density, and/or increased distance through the active space. The catalyst support materials may be provided in the following reactor forms: packed beds, fixed beds, fluidized beds, activated filter structures, activated papers, activated fluted papers, slurry beds, and trickle beds.

Also provided are papers including the activated fiber composition of any of the embodiments described above. Also provided are proton-exchange membrane ("PEM") fuel cells including the paper. When used in PEM fuel cells, papers including the activated fiber composition described herein may provide a thin, catalyst-coated paper to maximize the active volume and/or provide better utilization of catalyst elements (which may be quite expensive).

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The following embodiments of the present subject matter are disclosed:

An activated fiber composition including: (a) inorganic fibers having at least one of: (i) a surface area of at least 5 $m^2/g$; (ii) a porosity of at least 5% by volume; or (iii) a pore volume of at least 0.005 mL/g; and (b) an active agent incorporated into and/or applied onto at least a portion of the inorganic fibers.

The inorganic fibers may have at least one of: (i) a surface area of at least 15 $m^2/g$; (ii) a porosity of at least 10% by volume; or (iii) a pore volume of at least 0.01 mL/g. The inorganic fibers may have at least one of: (i) a surface area of at least 30 $m^2/g$; (ii) a porosity of at least 15% by volume; or (iii) a pore volume of at least 0.03 mL/g. The inorganic fibers may have at least one of: (i) a surface area of at least 45 $m^2/g$; (ii) a porosity of at least 20% by volume; or (iii) a pore volume of at least 0.05 mL/g. The inorganic fibers may have at least one of: (i) a surface area of at least 60 $m^2/g$; (ii) a porosity of at least 25% by volume; or (iii) a pore volume of at least 0.07 mL/g. The inorganic fibers may have at least one of: (i) a surface area of at least 75 $m^2/g$; (ii) a porosity of at least 30% by volume; or (iii) a pore volume of at least 0.09 mL/g. The inorganic fibers may have at least one of: (i) a surface area of at least 90 $m^2/g$; (ii) a porosity of at least 35% by volume; or (iii) a pore volume of at least 0.1 mL/g. The inorganic fibers may have at least one of: (i) a surface area of 5 to 220 $m^2/g$; (ii) a porosity of 5% to 60% by volume; or (iii) a pore volume of at least 0.005 to 0.25 mL/g. The inorganic fibers may have at least one of: (i) a surface area of 90 to 220 $m^2/g$; (ii) a porosity of 35% to 60% by volume; or (iii) a pore volume of at least 0.1 to 0.25 mL/g.

The inorganic fibers may have a surface area of at least 5 $m^2/g$, a surface area of at least 15 $m^2/g$, a surface area of at least 30 $m^2/g$, a surface area of at least 45 $m^2/g$, a surface area of at least 60 $m^2/g$, a surface area of at least 75 $m^2/g$, a surface area of at least 90 $m^2/g$, and/or a surface area of at most 220 $m^2/g$.

The inorganic fibers may have porosity of at least 5% by volume, at least 10% by volume, at least 15% by volume, at least 20% by volume, at least 25% by volume, at least 30% by volume, at least 35% by volume, and/or at most 60% by volume.

The inorganic fibers may have a pore volume of at least 0.005 mL/g, at least 0.01 mL/g, at least 0.03 mL/g, at least 0.05 mL/g, at least 0.07 mL/g, at least 0.09 mL/g, at least 0.1 mL/g, and/or at most 0.25 mL/g.

The inorganic fibers may have a mean pore radius of 20 to 300 Å. The inorganic fibers may have a pore diameter distribution of 10 to 200 Å. The inorganic fibers may be present in the activated fiber composition in an amount of 20 to 100 percent by weight, based on the total weight of the activated fiber composition. The inorganic fibers may comprise first inorganic fibers and second inorganic fibers, and the first inorganic fibers may have a porosity which is different from a porosity of the second inorganic fibers, and/or the first inorganic fibers may have a mean fiber diameter which is different from a mean fiber diameter of the second inorganic fibers, and/or the first inorganic fibers may have a mean fiber length which is different from a mean fiber length of the second inorganic fibers, and/or the first inorganic fibers may have a composition which is different from a composition of the second inorganic fibers.

The inorganic fibers may have a median fiber diameter of 0.25 to 20 μm, and the standard deviation of the median fiber diameter may be 2 μm or less or 1 μm or less.

The inorganic fibers may be able to withstand temperatures of 500° C. or greater, or up to 1,000° C. The inorganic fibers may include inorganic oxide fibers, ceramic fibers, refractory ceramic fibers, polycrystalline wool fibers, alumina fibers, high alumina fibers, glass fibers, silica fibers, boehmite fibers, low-biopersistence fibers, alkaline earth silicate fibers, calcia-alumina fibers, zirconia fibers, titania fibers, or combinations thereof.

The inorganic fibers may include refractory ceramic fibers including the fiberization product of 45 to 75 weight percent alumina and 25 to 55 weight percent silica. The inorganic fibers may include alkaline earth silicate fibers including the fiberization product of 60 to 90 weight percent silica, greater than 0 to 35 weight percent magnesia, and 5 weight percent or less impurities. The inorganic fibers may include alkaline earth silicate fibers including the fiberization product of 45 to 90 weight percent silica, greater than 0 to 45 weight percent calcia, greater than 0 to 35 weight percent magnesia, and 10 weight percent or less impurities. The inorganic fibers may include alkaline earth silicate fibers including the fiberization product of calcia and silica. The inorganic fibers may include calcia-alumina fibers including 20 to 80 weight percent calcia and 20 to 80 weight percent alumina. The inorganic fibers may include silica fibers including 90 weight percent or greater silica. The inorganic fibers may include alumina fibers including 90 weight percent or greater alumina. The inorganic fibers may include polycrystalline wool fibers including the fiberization product of 95 to 97 weight percent alumina, and 3 to 5 weight percent silica.

The active agent may include a catalytically-active agent, a gas-capture agent, or a combination thereof. The catalytically-active agent may include platinum, rubidium, antimony, copper, silver, palladium, ruthenium, bismuth, zinc, nickel, cobalt, chromium, cerium, titanium, iron, vanadium, gold, and/or manganese, in element and/or compound form, wherein, if the catalytically-active agent is in compound form, the compound may include one or more than one of these elements. The gas-capture agent may include a carbon dioxide capturing agent, a nitrogen oxide ($NO_x$) capturing agent, and/or a sorbent for trace metals. The carbon dioxide capturing agent may include calcium oxide. The nitrogen oxide ($NO_x$) capturing agent may include a barium-containing compound. The active agent may be present in the activated fiber composition in an amount of greater than 0 to 50 percent by weight, based on the total weight of the activated fiber composition.

The activated fiber composition may further include secondary inorganic fibers. The secondary inorganic fibers may have at least one of the following: (i) a surface area less than 4 $m^2$/g; (ii) a porosity of less than 4% by volume; or (iii) a pore volume of less than 0.004 mL/g. The secondary inorganic fibers may be present in the activated fiber composition in an amount of 1 to 80 percent by weight, based on the total weight of the activated fiber composition.

The activated fiber composition may further include organic fibers, metal fibers, and/or carbon fibers, and may further included a binder. The binder may include an organic binder and/or an inorganic binder. The organic binder may include polymer emulsions, solvent-based polymers, solvent-free polymers, starches, organic binder fibers, or mixtures thereof. The polymer emulsions may include latex, natural rubber latex, styrene-butadiene latex, butadiene-acrylonitrile latex, latexes of acrylate/methacrylate polymers/copolymers, or combinations thereof. The solvent-based polymers may include acrylics, polyurethanes, vinyl acetate, celluloses, rubber-based organic polymers, or combinations thereof. The solvent-free polymers may include natural rubber, styrene-butadiene rubber, elastomers, or combinations thereof. The starches may include potato starch, corn starch, or mixtures thereof. The organic binder fibers may include polyvinyl alcohol fibers and/or microfibrillated cellulose fibers. The inorganic binder may include a colloidal inorganic oxide dispersion comprising silica, alumina, titania, zinc, magnesia, zirconia, or mixtures thereof. The binder may be present in the activated fiber composition in an amount of 0.1 to 50 percent by weight, based on the total weight of the activated fiber composition.

The activated fiber composition may further include an intumescent material. The intumescent material may include mica, unexpanded vermiculite, ion-exchanged vermiculite, heat treated vermiculite, hydrobiotite, alkaline metal silicates, talc, clay, and/or expandable graphite. The intumescent material may be present in the activated fiber composition in an amount of 1 to 50 percent by weight, based on the total weight of the activated fiber composition.

Also provided is a fiber aggregate included the activated fiber composition of any of the embodiments discussed above. The fiber aggregate may be densified and/or needled and/or stitched.

Also provided is a composite material including the activated fiber composition of any of the embodiments discussed above and a support matrix at least partially supporting the activated fiber composition. The support matrix may include an inorganic oxide material.

Also provided is a filter element including the activated fiber composition of any of the embodiments discussed above. The filter element may include an exterior support structure, which may include a mesh. The mesh may include a metal mesh and/or a ceramic mesh. The filter element may also include a metallic wire provided within the filter element and/or a binder applied to a portion of the exterior surface of the filter element. The binder may be as described above.

Also provided is a filter system including a plurality of the above-described filter elements. Two of the plurality of filter elements may be different from each other in at least one of the following ways: (a) the porosity of the inorganic fibers present in each filter element; (b) the fiber diameter of the inorganic fibers present in each filter element; (c) the fiber length of the inorganic fibers present in each filter element;

(d) the fiber composition of the inorganic fibers present in each filter element; (e) the type of active agent present in each filter element; (f) the heat transfer coefficient of each filter element; or (g) the temperature resistance of each filter element.

Also provided is a catalytic element including the activated fiber composition of any of the embodiments discussed above. The catalytic element may include an exterior support structure, such as the one described above, and/or may include a metallic wire provided within the catalytic element and/or a binder applied to a portion of the exterior surface of the catalytic element. The binder may be as described above.

Also provided is an exhaust system including: one or more filter elements described above; and/or one or more catalytic elements described above.

EXAMPLES

Example 1

Four samples of alumina fibers (available from Unifrax I LLC (Tonawanda, N.Y., USA) under the registered trademark SAFFIL, surface area of 130 m$^2$/g) were impregnated with varying amounts of a platinum group metal-containing catalyst ("PGM") to provide activated fiber samples. Specifically, the activated fiber samples had 0.015 g of PGM, 0.022 g of PGM, 0.0307 g of PGM, and 0.0462 g of PGM. The PGM was prepared by mixing PtNO$_3$ and PdNO$_3$ solutions to attain a Pt:Pd ratio of 2:1.

Figure 14A:
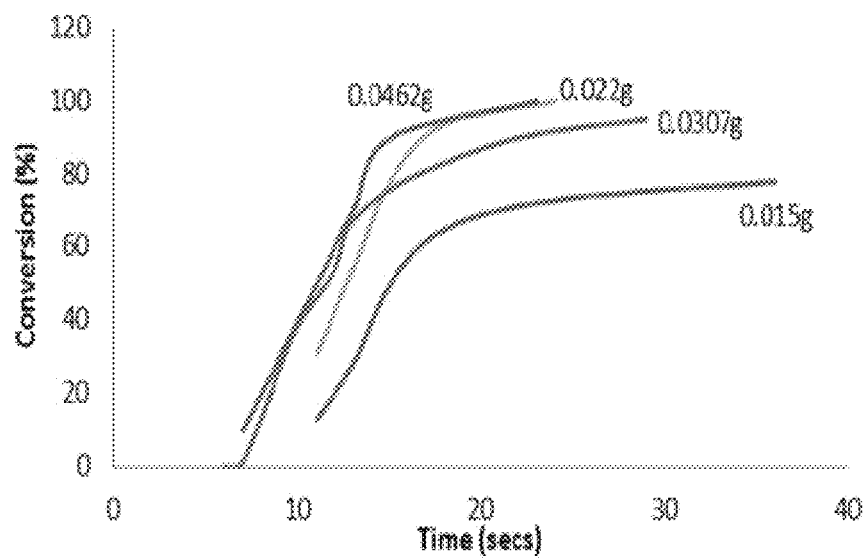
FIG. 14A is a graph summarizing the results of Example 1.
Figure 14B:
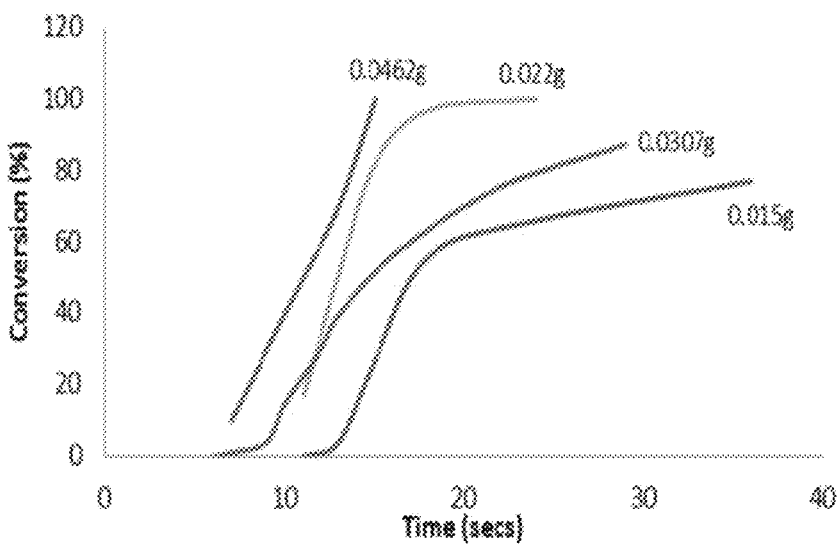
FIG. 14B is a graph summarizing the results of Example 1.

Each of the activated fiber samples was exposed to gas from an isothermal furnace having an output temperature of 400° C. The gas was then fed to a bank of calibrated gas emission analyzers that measured emission concentration. From these measurements, a light-off curve was produced for each of the activated fiber samples, showing conversion performance over a range of time. FIG. 14A shows light-off curves for conversion of carbon monoxide and FIG. 14B shows light-off curves for conversion of volatile organic compounds ("VOC").

Example 2

Conventional ceramic honeycomb filters, namely a 400 cpsi filter and a 900 cpsi filter each having a diameter of 2", were washcoated in with a slurry containing PGM. The measured PGM content on the coated honeycomb filters was 0.0477 g for the 400 cpsi filter and 0.0307 g for the 900 cpsi filter. The filters were evaluated in the same manner as in Example 1. The results are shown in FIGS. 15A and 15B along with the light-off curves for the 0.022 g PGM activated fiber sample and the 0.0462 activated fiber sample from Example 1.

Figure 15A:
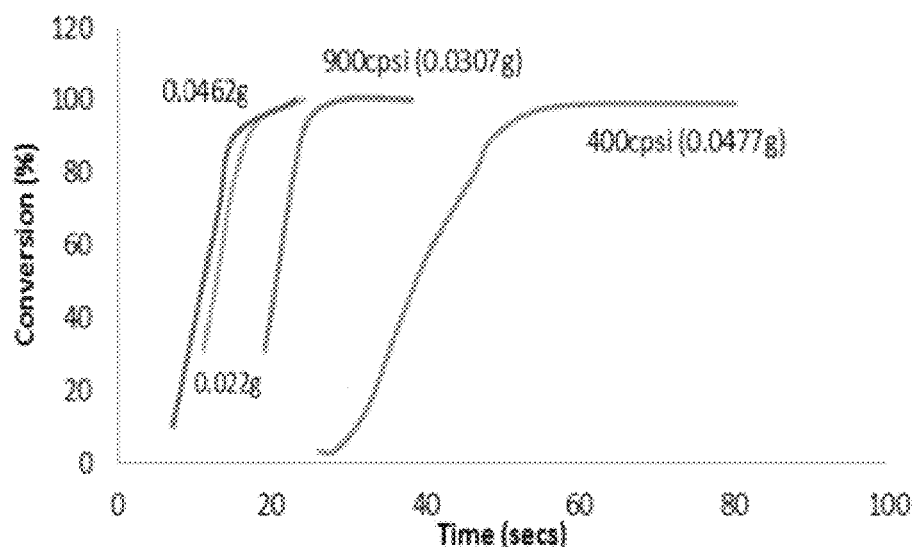
FIG. 15A is a graph summarizing the results of Example 2.
Figure 15B:
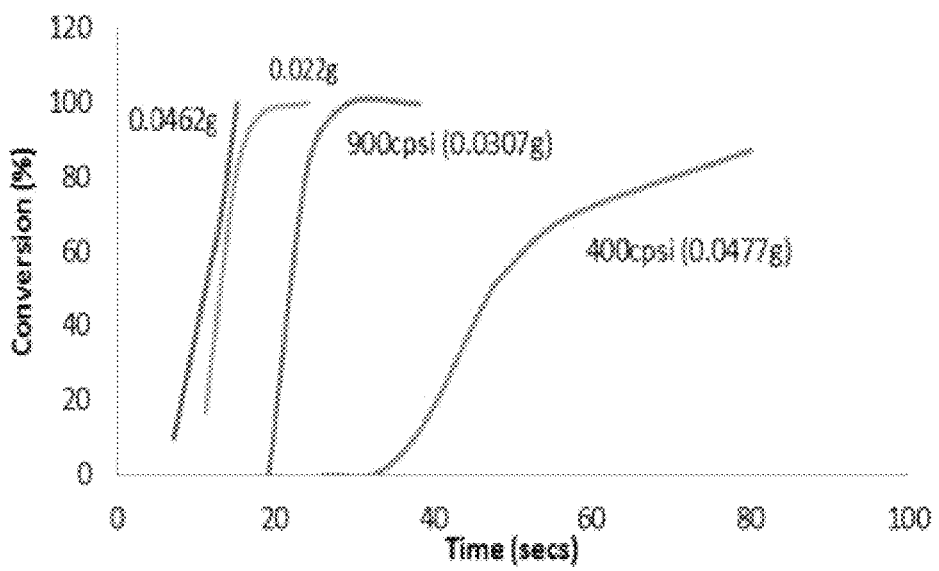
FIG. 15B is a graph summarizing the results of Example 2.

As shown in FIGS. 15A and 15B, each of the activated fiber samples outperformed the 900 cpsi filter and greatly outperformed the 400 cpsi filter. This is observed even though the 0.022 g PGM activated fiber sample contained less than 72% of the amount of PGM on the 900 cpsi filter and less than half of the amount of PGM on the 400 cpsi filter.

Example 3

A sample of alumina fibers (available from Unifrax I LLC (Tonawanda, N.Y., USA) under the registered trademark SAFFIL, surface area of 130 m$^2$/g) was impregnated with 0.0462 g of PGM to provide an activated fiber sample. A 400 cpsi filter was washcoated in a slurry containing PGM, and the measured amount of PGM on the 400 cpsi filter was 0.0448 g. Each of the activated fiber sample and the 400 cpsi filter were evaluated in the manner described in Example 1.

Figure 16A:
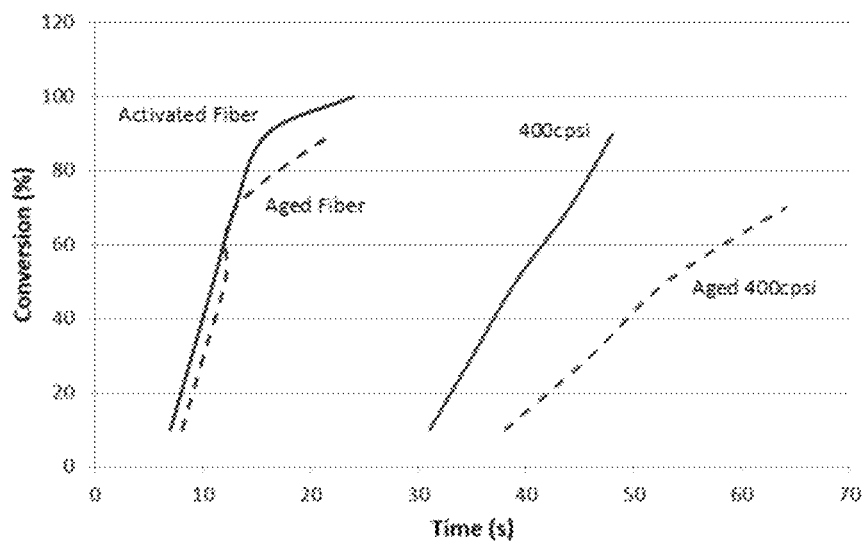
FIG. 16A is a graph summarizing the results of Example 3.
Figure 16B:
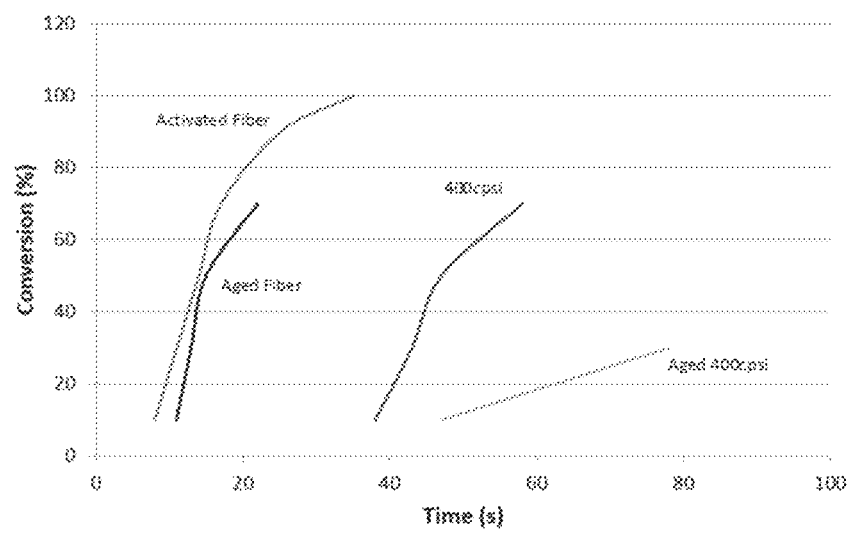
FIG. 16B is a graph summarizing the results of Example 3.

Thereafter, the activated fiber sample and the 400 cpsi filter were subjected to accelerated aging by heating in air at 800° C. for 24 hours to simulate severe conditions experienced in many applications. The aged samples were then evaluated in the manner described in Example 1. The results are shown in FIGS. 16A and 16B. As shown in FIGS. 16A and 16B, the aged activated fiber sample demonstrated superior durability as compared with the 400 cpsi filter. In fact, the aged activated fiber sample had a shorter light-off time than both the aged 400 cpsi filter and the fresh 400 cpsi filter in both CO conversion and VOC conversion.

What is claimed is:

1. A fiber blanket comprising:
   inorganic fibers having a surface area of at least 15 m$^2$/g;
   an active agent incorporated into the inorganic fibers and/or applied onto at least a portion of the inorganic fibers; and
   a sorbent for lead or cadmium incorporated into the inorganic fibers and/or applied onto at least a portion of the inorganic fibers;
   wherein the active agent is present in an amount, based on a total weight of the composition, of 1 to 25 percent by weight;
   wherein the inorganic fibers have a median fiber diameter of 1 to 10 μm;
   wherein the inorganic fibers comprise:
      (i) fibers comprising 50 weight percent by weight or greater silica; and/or
      (ii) fibers comprising 50 weight percent by weight or greater alumina; and/or
      (iii) zirconia fibers comprising less than 1 percent by weight titania;
   wherein the sorbent for lead or cadmium is an aluminosilicate compound; and
   wherein the fiber blanket is formed via air-laying.

2. The fiber blanket according to claim 1, wherein the active agent is a transitional metal-containing catalyst.

3. The fiber blanket according to claim 2, wherein the active agent is present in an amount, based on a total weight of the fiber blanket, of 2 to 20 percent by weight, 3 to 15 percent by weight, or 3 to 10 percent by weight.

4. The fiber blanket according to claim 2, wherein the active agent comprises a platinum group metal-containing catalyst.

5. The fiber blanket according to claim 2, further comprising at least one secondary agent selected from a carbon dioxide capturing agent or a nitrogen oxide capturing agent;
   wherein the secondary agent is incorporated into the inorganic fibers or applied onto at least a portion of the inorganic fibers.

6. The fiber blanket according to claim 1, wherein the inorganic fibers have a median fiber diameter of 4 to 10 μm and less than 0.1 percent by weight of the inorganic fibers have a diameter of less than 3 μm.

7. The fiber blanket according to claim 1, wherein the inorganic fibers have a melting point of 1500° C. or greater.

8. An emission control device comprising:
   a fiber blanket formed via air-laying and comprising inorganic fibers having a surface area of at least 15 m$^2$/g, an active agent incorporated into the inorganic fibers and/or applied onto at least a portion of the inorganic fibers, and a sorbent for lead or cadmium incorporated into the inorganic fibers and/or applied onto at least a portion of the inorganic fibers; and a permeable support, wherein the fiber blanket is enclosed within the permeable support and the permeable support allows fluid communication therethrough;

wherein the active agent is present in an amount, based on a total weight of the fiber blanket, of 1 to 25 percent by weight;

wherein the inorganic fibers have a median fiber diameter of 1 to 10 μm;

wherein the inorganic fibers comprise:
(i) fibers comprising 50 weight percent by weight or greater silica; and/or
(ii) fibers comprising 50 weight percent by weight or greater alumina; and/or
(iii) zirconia fibers comprising less than 1 percent by weight titania; and wherein the sorbent for lead or cadmium is an alumino-silicate compound.

9. The device according to claim 8, wherein the active agent is a transition metal-containing catalyst.

10. The device according to claim 9, wherein the active agent is present in an amount, based on a total weight of the composition, of 3 to 10 percent by weight.

11. The device according to claim 9, wherein the active agent comprises a platinum group metal-containing catalyst.

12. The device according to claim 9, further comprising at least one secondary agent selected from a carbon dioxide capturing agent or a nitrogen oxide capturing agent;
wherein the secondary agent is incorporated into the inorganic fibers or applied onto at least a portion of the inorganic fibers.

13. The device according to claim 8, wherein the inorganic fibers have a median fiber diameter of 4 to 10 μm and less than 0.1 percent by weight of the inorganic fibers have a diameter of less than 3 μm.

14. The device according to claim 9, wherein the inorganic fibers have a melting point of 1500° C. or greater.

15. The device according to claim 9, wherein the permeable support is a mesh.

16. The device according to claim 15, wherein the permeable support is a metallic mesh or a polymeric mesh.

17. The fiber blanket according to claim 1, further comprising a carbon dioxide capturing agent incorporated into the inorganic fibers or applied onto at least a portion of the inorganic fibers;
wherein the carbon dioxide capturing agent is at least one selected from the group consisting of barium carbonate, barium oxide, and barium hydroxide; and
wherein the carbon dioxide capturing agent present in an amount, based on a total weight of the fiber blanket, of 0.001 to 2 percent by weight.

18. The device according to claim 10, further comprising a carbon dioxide capturing agent incorporated into the inorganic fibers or applied onto at least a portion of the inorganic fibers;
wherein the carbon dioxide capturing agent is at least one selected from the group consisting of barium carbonate, barium oxide, and barium hydroxide; and
wherein the carbon dioxide capturing agent present in an amount, based on a total weight of the fiber blanket, of 0.001 to 2 percent by weight.

19. The fiber blanket according to claim 1, wherein the inorganic fibers comprise 95 to 97 percent by weight alumina and 3 to 5 percent by weight silica.

20. The fiber blanket according to claim 19, wherein the inorganic fibers comprise crystalline alumina to promote crystallographic growth and wherein a content of the crystalline alumina is less than 1 percent by weight.

21. The fiber blanket according to claim 20, wherein the inorganic fibers have a pore diameter distribution of 10 to 200 angstroms.

22. The fiber blanket according to claim 21, wherein the inorganic fibers have a pore diameter distribution of 50 to 200 angstroms.

23. The device according to claim 8, wherein the inorganic fibers comprise 95 to 97 percent by weight alumina and 3 to 5 percent by weight silica.

24. The device according to claim 23, wherein the inorganic fibers comprise crystalline alumina to promote crystallographic growth and wherein a content of the crystalline alumina is less than 1 percent by weight.

25. The device according to claim 24, wherein the inorganic fibers have a pore diameter distribution of 10 to 200 angstroms.

26. The device according to claim 24, wherein the inorganic fibers have a pore diameter distribution of 50 to 200 angstroms.

27. A fiber blanket consisting of:
inorganic fibers having a surface area of at least 15 m$^2$/g;
an active agent incorporated into the inorganic fibers and/or applied onto at least a portion of the inorganic fibers; and
optionally, a secondary agent incorporated into the inorganic fibers and/or applied onto at least a portion of the inorganic fibers;
wherein the active agent is one or more transition metal-containing catalysts;
wherein the active agent is present in an amount, based on a total weight of the fiber blanket, of 1 to 25 percent by weight;
wherein the inorganic fibers have a median fiber diameter of 1 to 10 μm;
wherein the inorganic fibers consist of:
(i) fibers having 50 weight percent by weight or greater silica; and/or
(ii) fibers having 50 weight percent by weight or greater alumina; and/or
(iii) zirconia fibers having less than 1 percent by weight titania;
wherein the secondary agent consists of calcium oxide, barium oxide, barium hydroxide, barium carbonate, an alumino-silicate composition, or combinations thereof; and
wherein the fiber blanket is formed via air-laying.

28. The fiber blanket of claim 27, wherein the inorganic fibers contain 95 to 97 percent by weight alumina and 3 to 5 percent by weight silica.

29. The fiber blanket of claim 27, wherein the fiber blanket comprises the secondary agent incorporated into the inorganic fibers and/or applied onto at least a portion of the inorganic fibers.

* * * * *